(12) United States Patent
Arur et al.

(10) Patent No.: US 11,165,491 B2
(45) Date of Patent: Nov. 2, 2021

(54) LOCATION MANAGEMENT FOR SATELLITE SYSTEMS

(71) Applicant: Hughes Network Systems, LLC, Germantown, MD (US)

(72) Inventors: Deepak Arur, Vienna, VA (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/237,135

(22) Filed: Dec. 31, 2018

(65) Prior Publication Data

US 2020/0213000 A1 Jul. 2, 2020

(51) Int. Cl.
*H04B 7/185* (2006.01)
*H04B 7/204* (2006.01)
*H04W 84/06* (2009.01)
*H04W 88/16* (2009.01)

(52) U.S. Cl.
CPC ..... *H04B 7/18545* (2013.01); *H04B 7/18532* (2013.01); *H04B 7/18565* (2013.01); *H04B 7/2041* (2013.01); *H04W 84/06* (2013.01); *H04W 88/16* (2013.01)

(58) Field of Classification Search
CPC ............ H04B 7/18545; H04B 7/18532; H04B 7/18565
See application file for complete search history.

(56) References Cited

U.S. PATENT DOCUMENTS

| | | | |
|---|---|---|---|
| 5,689,568 | A | 11/1997 | Laborde |
| 5,781,540 | A | 7/1998 | Malcolm et al. |
| 6,018,659 | A | 1/2000 | Ayyagari et al. |
| 6,157,811 | A | 12/2000 | Dent |
| 7,133,418 | B1 | 11/2006 | Macridis et al. |
| 8,396,476 | B2 | 3/2013 | Thiebaut et al. |

(Continued)

OTHER PUBLICATIONS

Thales et al: NR-NTN: Preliminary solutions for NR to support non-terrestrial networks(3GPP Draft; RP vol. TSG RAN, No. La Jolla, USA; Jun. 11, 2018-Jun. 144, 2018 Jun. 2018 (Jun. 4, 2018), XP051455160) (Year: 2018).*

(Continued)

*Primary Examiner* — Muthuswamy G Manoharan
(74) *Attorney, Agent, or Firm* — Fish & Richardson P.C.

(57) ABSTRACT

Methods, systems, and apparatus, including computer-readable media, for location management for satellite systems. In some implementations, a controller of a satellite network system receives location data from a user terminal and registers the user terminal in a mobility area with a core network. The controller updates a mapping between satellite beams and mobility areas as the satellite beams move along the ground with respect to the mobility areas, then uses the updated mapping to communicate with the user terminal using an appropriate satellite beam. In some implementations, a controller of a satellite network system determines a mapping of satellite beams to mobility areas, and broadcasts, for each of multiple satellite beams, a message indicating (i) a set of mobility areas that are at least partially covered by the satellite beam and (ii) an indication of boundaries of the mobility areas in the set of mobility areas.

19 Claims, 13 Drawing Sheets

(56) References Cited

U.S. PATENT DOCUMENTS

| | | | |
|---|---|---|---|
| 8,788,662 | B2 | 7/2014 | Nylander et al. |
| 8,965,370 | B2 | 2/2015 | Wu |
| 9,060,299 | B2 | 6/2015 | Morad et al. |
| 9,329,701 | B2 * | 5/2016 | Lautner .................. G06F 1/3206 |
| 9,615,271 | B2 | 4/2017 | Morad et al. |
| 9,763,167 | B2 | 9/2017 | Gopal et al. |
| 10,177,837 | B2 | 1/2019 | Ravishankar et al. |
| 2002/0052180 | A1 | 5/2002 | Ravishankar et al. |
| 2003/0045241 | A1 | 3/2003 | Noerpel et al. |
| 2005/0090256 | A1 | 4/2005 | Dutta |
| 2005/0221831 | A1 | 10/2005 | Pecen et al. |
| 2008/0207260 | A1 * | 8/2008 | Dent ........................ H04W 8/08 455/556.1 |
| 2010/0197307 | A1 | 8/2010 | Horn et al. |
| 2013/0117775 | A1 * | 5/2013 | Perry, II .............. H04L 65/1073 725/14 |
| 2018/0242345 | A1 | 8/2018 | Johnson et al. |
| 2019/0082481 | A1 | 3/2019 | Ravishankar et al. |
| 2020/0007604 | A1 | 1/2020 | Padmanabhan et al. |
| 2020/0077358 | A1 * | 3/2020 | Kovacs .................. H04B 7/185 |
| 2020/0107164 | A1 * | 4/2020 | Lopatin ........... H04W 12/00503 |
| 2020/0162901 | A1 * | 5/2020 | Liu ......................... H04W 4/40 |

OTHER PUBLICATIONS

5G PPP, "View on 5G Architecture," 5G PPP Architecture Working Group, Version 3.0, Jun. 19, 2019, 166 pages.

GSMA.com [online], "Mobile Backhaul: An Overview," last updated Jun. 19, 2019, retrieved on Mar. 23, 2020, retrieved from URL<https://www.gsma.com/futurenetworks/wiki/mobile-backhaul-an-overview/>, 14 pages.

Jain et al., "Are Mobility Management Solutions Ready for 5G?," ArXiv, abs/1902.02679, 2019, 10 pages.

Manjaiah, et al., "Challenges and Issues in 4G—Networks Mobility Management," International Journal of Computer Trends and Technology, May 2013, 4(5):124'Jul. 1250.

MetaSwitch.com [online], "What is the 5G Access and Mobility Management Function (AMF)?," available on or before Aug. 29, 2019, retrieved on Mar. 23, 2020, retrieved from URL<https://www.metaswitch.com/knowledge-center/reference/what-is-the-5gaccess-and-mobility-management-function-amf>, 3 pages.

ScienceDirect.com [online], "Mobility Management," retrieved on Mar. 23, 2020, retrieved from URL<https://www.sciencedirect.com/topics/computer-science/mobility-management>, 11 pages.

Verma et al., "Mobility Management in 4G Networks," Global Journal of Computer Science and Technology Network, Web & Security, 2013. 13(7):35-40.

Wikipedia.org [online], "Cellular Network," last updated Mar. 5, 2020, retrieved on Mar. 23, 2020, retrieved front URL<https://en.wikipedia.org/wiki/Cellular_network>, 8 pages.

Wikipedia.org [online], "Diffie-Hellman Key Exchange," last updated Mar. 20, 2020, retrieved on Mar. 23, 2020, retrieved from URL<https://en.wikipedia.org/wiki/Diffie%E2%80%93Hellman_key_exchange>, 7 pages.

Wikipedia.org [online], "Mobility Management," last updated Feb. 18, 2020, retrieved on Mar. 23, 2020, retrieved from URL <https://en.wikipedia.org/wiki/Mobility_management>, 3 pages.

Wikipedia.org [online], "Public-key Cryptography," last updated Mar. 21, 2020, retrieved on Mar. 23, 2020, retrieved from URL<https://en.wikipedia.org/wiki/Public-key_cryptography>, 5 pages.

Wikipedia.org [online], "Symmetric-key Algorithm," last updated Feb. 22, 2020, retrieved on Mar. 23, 2020, retrieved from URL<https://en.wikipedia.org/wiki/Symmetric-key_algorithm>, 3 pages.

Wikipedia.org [online], "Triangulation," last updated Feb. 21, 2020, retrieved on Mar. 23, 2020, retrieved from URL<https://en.wikipedia.org/wiki/Triangulation>, 2 pages.

Wikipedia.org [online], "True Range Multilateration," last updated Mar. 15, 2020, retrieved on Mar. 23, 2020, retrieved from URL<https://en.wikipedia.org/wiki/True_range_multilateration>, 8 pages.

Yousaf et al., "On End-to-End Mobility Management in. 4G Heterogeneous Wireless Networks," 2008 IEEE International Networking and Communications Conference, May 1-3, 2008, Lahore, Pakistan, 118-123.

Hughes, "NR-NTN: Paging in NGSO Satellite Systems," 3GPP TSG RAN WG3 Meeting #101, R3-184403, Agenda Item: 20.2.3, Aug. 20-24, 2018, Gothernburg, Sweden, 5 pages.

PCT International Search Report and Written Opnioin in International Appln. No. PCT/US2019/068546, dated Apr. 1, 2020, 12 pages.

Thales et al., "NR-NTN: Preliminary Solutions for NR to Support Non-Terrestrial Networks," 3GPP TSG RAN Meeting #80, RP-180664, Agenda Item: 9.4.1, Jun. 11-14, 2018, La Jolla, California, USA, 16 pages.

PCT International Preliminary Report on Patentability in International Appln. No. PCT/US2019/068546, dated Jul. 15, 2021, 9 pages.

* cited by examiner

LOCATION MANAGEMENT FOR SATELLITE SYSTEMS

TECHNICAL FIELD

This specification generally relates to location management for satellite systems.

BACKGROUND

To access a network, a mobile user terminal may use a radio access network to provide data to and receive data from a core network. Many terminals use ground-based cellular networks, and many protocols for accessing core networks are defined around the characteristics of ground-based networks.

SUMMARY

In some implementations, a satellite network system can coordinate satellite-based radio access in a manner that is compatible with land-based protocols. In particular, the system can coordinate messaging using defined geographical regions referred to as mobility areas, even when satellite beam coverage is constantly moving with respect to the ground. This can facilitate functions such as registration of user terminals and paging using core network technologies and protocols designed for land-based cellular systems. For example, the satellite system can be seamlessly used as a radio access network to connect user terminals to a core network, even though the core network is not aware that the satellite network operates differently from land-based networks. As a result, the satellite network can be used with no changes to the core network, and in a way that is transparent to the core network, to provide interoperability between satellite networks with standard, land-based core networks and protocols.

Many modern networks include a core network and a radio access network, which generally perform different functions. The core network usually maintains data connections to packet data network such as the Internet, authorization, authentication, subscriptions for user terminals, and so on. The radio access network primarily acts as a wireless link to the core network, e.g., providing connectivity service between user terminals and the core network. Protocols to interface between the radio access network and the core network are usually well defined. In some implementations, the techniques discussed below allow a satellite network front end to be used instead of a ground-based cellular network front end, without changes to the core network. As a result, standard, off-the-shelf 3G, 4G, or 5G core network products can be used with the satellite network.

There are a number of physical differences between satellite and terrestrial networks. For example, terrestrial networks typically have many stationary base stations that each have a small service radius. Terrestrial protocols are based on the assumption that base stations are in fixed locations and that mobile user terminals move relatively slowly. In a satellite constellation, however, low earth orbit (LEO) satellites may move relative to their coverage areas. Further, the coverage area for each beam is much larger than a ground-based cell and the movement of each beam over the land is often very fast, much faster than user terminals move. Because the beams are constantly moving with respect to the ground, there is no fixed mapping of individual beams with the ground regions. Terrestrial core networks are not aware of the technology differences between terrestrial and satellite-based radio networks, and altering the core network is often not feasible as it is often managed and controlled by a third party.

This document describes user terminal location and mobility management approaches for mobile satellite systems, which can be used with geostationary (GEO), medium earth orbit (MEO) and low earth orbit (LEO) satellites. In some implementations, a controller for a satellite-based radio access network can determine a mapping between satellite beams and mobility areas. Each satellite beam can transmit information indicating the identity of mobility areas at least partially covered by the satellite beam and also data indicating the boundaries of those mobility areas. In some implementations, user terminals can report their positions to a satellite-based radio access network. The controller for the radio access network can store data indicating the boundaries of the mobility areas, and then look up which mobility area a user terminal is in. These techniques and others are discussed in greater detail below.

In one general aspect, a method performed by one or more computers of a satellite network system includes: receiving, from a user terminal configured to communicate using the satellite network system, location data indicating a location of the user terminal; identifying, from among multiple mobility areas representing fixed geographical regions, a mobility area of the user terminal based on the location data; registering the user terminal in the identified mobility area with a core network; updating a mapping between satellite beams of the satellite network system and the mobility areas as the satellite beams move along the ground with respect to the mobility areas; and after updating the mapping, identifying a satellite beam currently corresponding to the location of the terminal using the updated mapping between the satellite beams and the mobility areas and communicating with the user terminal using the identified satellite beam.

Implementations may include one or more of the following features. For example, in some implementations, the updating of the mapping is performed after registering the user terminal, and the satellite beam identified after the mapping is updated is different from the satellite beam used to register the user terminal. This may be due to movement of the satellite beam and/or the user terminal.

In some implementations, the method includes, after registering the user terminal in the identified mobility area, receiving, from the core network, a request corresponding to the user terminal; and identifying the satellite beam and communicating with the user terminal are performed in response to receiving the request corresponding to the user terminal.

In some implementations, the request corresponding to the user terminal is a paging request from the core network; and communicating with the user terminal using the identified satellite beam comprises paging the user terminal using the identified satellite beam according to the paging request.

In some implementations, the method includes, after receiving the location data, storing data indicating the location of the user terminal; and retrieving the stored data indicating the location of the user terminal. The retrieved data indicating the location of the user terminal is used to identify the satellite beam.

In some implementations, the method includes periodically receiving, from the user terminal, updated location data; updating the stored data indicating the location of the user terminal; determining, based on the updated location data, that the user terminal has left the identified mobility area and entered a second mobility area; and in response to determining that the user terminal has entered the second mobility area, designating the second mobility area as a current mobility area for the user terminal.

In some implementations, registering the user terminal comprises registering the user terminal using a first satellite beam with the user terminal in a first mobility area. Identifying the satellite beam comprises identifying, while the user terminal is located in the first mobility area, a second satellite beam as corresponding to the location of the user terminal, the second satellite beam being different from the first satellite beam.

In some implementations, the core network is a 3G, 4G, or 5G core network. The satellite system acts as a radio access network providing connectivity for a plurality of user terminals to communicate with the core network, the satellite system using communication protocols for terrestrial cellular systems in a manner that is transparent to the core network.

In some implementations, the mobility areas comprise 3G routing areas, 4G tracking areas, or 5G tracking areas.

In some implementations, for at least a portion of a time period that the user terminal is registered in the identified mobility area, a single satellite beam concurrently covers portions of multiple mobility areas; and updating the mapping between satellite beams of the satellite network system and the mobility areas comprises updating the mapping to indicate that the single satellite beam covers portions of multiple mobility areas.

In some implementations, for at least a portion of a time period that the user terminal is registered in the identified mobility area, a single mobility area of the mobility areas is covered by portions of multiple satellite beams; and updating the mapping between satellite beams of the satellite network system and the mobility areas comprises updating the mapping to indicate multiple satellite beams corresponding to a single mobility area.

In some implementations, receiving the location data comprises receiving global positioning system (GPS) coordinates determined using a GPS receiver of the user terminal.

In some implementations, receiving the location data comprises receiving data indicating receipt of a signal from the user terminal by multiple different satellites in the satellite network system; and the method comprises estimating a location of the user terminal using triangulation and/or trilateration.

In some implementations, receiving the location data comprises receiving location data encrypted using symmetric key encryption or asymmetric key encryption.

In some implementations, the method includes communicating using asymmetric key encryption comprising: broadcasting a public key to each of multiple user terminals; receiving location data from each of the multiple user terminals encrypted using the public key; and decrypting the received location data using a private key, In some implementations, the method includes communicating using symmetric key encryption comprising: communicating with the multiple user terminals via unicast to generate a shared session key for each user terminal using a key agreement protocol such as Diffie-Hellmann; receiving location data from the multiple user terminals, the location data for each of the user terminals being encrypted using the corresponding session key agreed upon with the user terminal; and decrypting the received location data using the different session keys agreed upon with the user terminals.

In some implementations, the satellite beams are satellite beams of satellites in low earth orbit (LEO) or medium earth orbit (MEO).

In some implementations, the satellite beams are satellite beams of satellites in geostationary (GEO) orbit.

In another general aspect, a method performed by one or more computers of a satellite network system includes: determining a mapping of satellite beams to mobility areas representing fixed geographical regions; generating, for each of the satellite beams, a message indicating (i) a set of mobility areas that are at least partially covered by the satellite beam and (ii) an indication of boundaries of the mobility areas in the set of mobility areas; and broadcasting the messages in the respective satellite beams.

Implementations may include one or more of the following features. For example, in some implementations, the messages are provided in respective system information blocks for the satellite beams, and the messages indicate different sets of mobility areas for different satellite beams.

In some implementations, the indication of boundaries of the mobility areas comprises data indicating vertices of boundaries of each of the mobility areas in the set of mobility areas.

In some implementations, the method includes: updating the mapping of the satellite beams to the mobility areas to indicate a changed relationship between the satellite beams and the mobility areas; generating, for each of the satellite beams, an updated message indicating (i) a second set of mobility areas that are at least partially covered by the satellite beam and (ii) an indication of boundaries of the mobility areas in the second set of mobility areas, at least some of the second sets of mobility areas are different from the sets of mobility areas indicted by the previously broadcast messages; and broadcasting the updated messages in the respective satellite beams. The updating the mapping, generating the updated messages, and broadcasting the updated messages are repeated periodically.

In some implementations, the satellite beams are satellite beams of satellites in low earth orbit (LEO) or medium earth orbit (MEO).

In some implementations, the satellite beams are satellite beams of satellites in geostationary (GEO) orbit.

Other embodiments of these aspects include corresponding systems, apparatus, and computer programs, configured to perform the actions of the methods, encoded on computer storage devices. For example, a satellite gateway or controller for a radio access network can be configured to perform the actions or to cause a satellite network to perform the actions. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more Implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
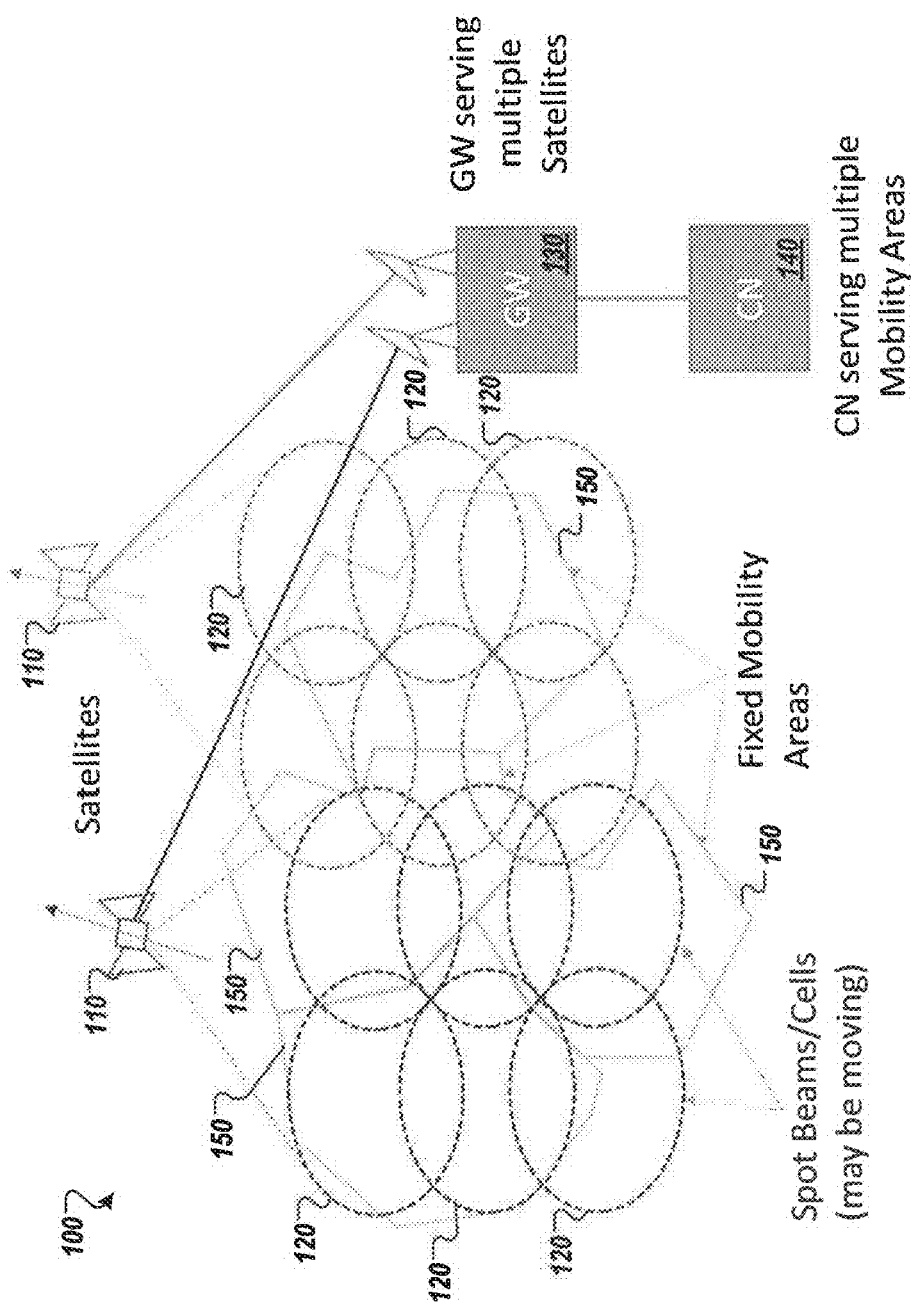
FIG. 1 is a diagram that shows an example of a satellite-based communication system.

The techniques discussed below can be used with systems having 3$^{rd}$ Generation Partnership Project (3GPP) 5G, 4G and 3G core networks. Accordingly, rather than use terminology specific to one of these network types, more general terms are used to represent functionally equivalent concepts in 5G, 4G, and 3G networks, as discussed below. The mappings to 5G, 4G, and 3G terms below are intended to be exemplary only, and additional or alternative mappings (including mappings with elements different from those of 5G, 4G, and 3G standards) can be used.

The term "NAS Temporary ID" refers generally to a unique temporary identifier for a user terminal assigned by the core network while the user terminal is registered. This identifier is assigned initially during the initial registration procedure, and may subsequently be reassigned during registration/mobility procedures such as Mobility Registration Update (5G), Tracking Area Update (4G), or Routing Area Update (3G).

For a 5G core network, the globally-unique NAS Temporary Identifier can be the 5G-GUTI (5G Globally Unique Temporary Identifier), which combines the GUAMI (Globally Unique AMF Identifier) and the 5G-TMSI (AMF-specific Temporary Mobile Subscriber Identifier). The GUAMI itself is composed of the PLMN ID (Public Land Mobile Network identifier), AMF Region ID, AMF Set ID and AMF Pointer. The combination of the AMF Set ID, AMF Pointer and 5G-TMSI is called the 5G-S-TMSI, and is used as a unique identifier within the scope of an AMF region. These relationships are summarized below, with the "+" symbol representing concatenation of identifiers:

NAS Temporary Identifier=5G-GUTI=GUAMI+5G-TMSI

GUAMI=PLMN+AMF Region ID+AMF Set ID+AMF Pointer

5G-S-TMSI=AMF Set ID+AMF Pointer+5G-TMSI

For a 4G core network, the globally-unique NAS Temporary Identifier is the GUTI (Globally Unique Terminal Identifier), which combines the GUMMEI (Globally Unique MME Identifier) and the M-TMSI (MME specific Temporary Mobile Subscriber Identifier). The GUMMEI itself is composed of the PLMN ID (Public Land Mobile Network identifier), MMEGI (MME Group ID) and MMEC (MME Code within the MME Group). The combination of the MMEC and M-TMSI is called the S-TMSI, and is used as a unique identifier within the scope of an MME service area (MME Group). These relationships are summarized below, with the "+" symbol representing concatenation of identifiers:

NAS Temporary Identifier=GUTI=GUMMEI+M-TMSI

GUMMEI=PLMN+MMEGI+MMEC

S-TMSI=MMEC+M-TMSI

For a 3G core network, the globally-unique NAS Temporary Identifier is the combination of the RAI (Routing Area Identifier) and the P-TMSI (Packet domain Temporary Mobile Subscriber Identifier). The RAI itself is composed of the PLMN ID (Public Land Mobile Network identifier), LAC (Location Area Code) and RAC (Routing Area Code). These relationships are summarized below, with the "+" symbol representing concatenation of identifiers:

NAS Temporary Identifier=RAI+P-TMSI

RAI=PLMN ID+LAC+RAC

The term "Mobility Area" refers generally to an identifier for geographical area served by a group of base stations, used to identify the location of a user terminal in core network registration and mobility tracking procedures.

For a 5G or 4G core network, the mobility area corresponds to a tracking area. The Mobility Area Identifier is the TAI (Tracking Area Identifier), which includes of the PLMN ID and the TAC (Tracking Area Code), as shown by the relationship below, with the "+" symbol representing concatenation of identifiers.

Mobility Area ID=TAI=PLMN ID+TAC

For a 3G core network, the mobility area corresponds to a Routing Area. The Mobility Area Identifier is the RAI (Routing Area Identifier), which includes the PLMN ID, LAC (Location Area Code) and the RAC (Routing Area Code), with the "+" symbol representing concatenation of identifiers.

Mobility Area ID=RAI=PLMN ID+LAC+RAC

The term "Initial Registration Procedure" refers generally to the procedure by which the user terminal initially performs mutual authentication with the core network, obtains its current NAS Temporary ID and Mobility Area information, etc. For a 5G core network, the initial registration procedure corresponds to the Registration procedure. For a 4G core network, the initial registration procedure corresponds to the Attach procedure. For a 3G core network, the initial registration procedure corresponds to the GPRS Attach procedure.

The term "Registration Update Procedure" refers generally to the mobility management procedure by which the core network tracks the location of the user terminal at the level of a Mobility Area. For a 5G core network, the registration update procedure corresponds to a MRU (Mobility Registration Update) procedure. For a 4G core network, the registration update procedure corresponds to a TAU (Tracking Area Update) procedure. For a 3G core network, the registration update procedure corresponds to a RAU (Routing Area Update) procedure.

FIG. 1 is a diagram that shows an example of a satellite-based communication system 100. The system includes various satellites 110 that provide radio access network service to connect user terminals to a core network 140.

Typical core networks manage paging and other functions using mobility areas 150 that are defined to each cover a fixed geographical region. As a user terminal moves, it is desirable to know which mobility area the user terminal is located in. As discussed below, the satellite beams 120 often move with respect to the mobility areas 150, making the determination of the satellite beam 120 and mobility area 150 for a user terminal a challenge. Two major approaches for determining the mobility area 150 for a user are discussed below.

In some implementations, a controller for a satellite-based radio access network can determine a mapping between satellite beams and mobility areas. Each satellite beam can transmit information indicating the identity of mobility areas at least partially covered by the satellite beam and also data indicating the boundaries of those mobility areas.

In some implementations, user terminals can report their positions to a satellite-based radio access network. The controller for the radio access network can store data indicating the boundaries of the mobility areas, and then look up which mobility area a user terminal is in. These techniques and others are discussed in greater detail below.

Figure 2:
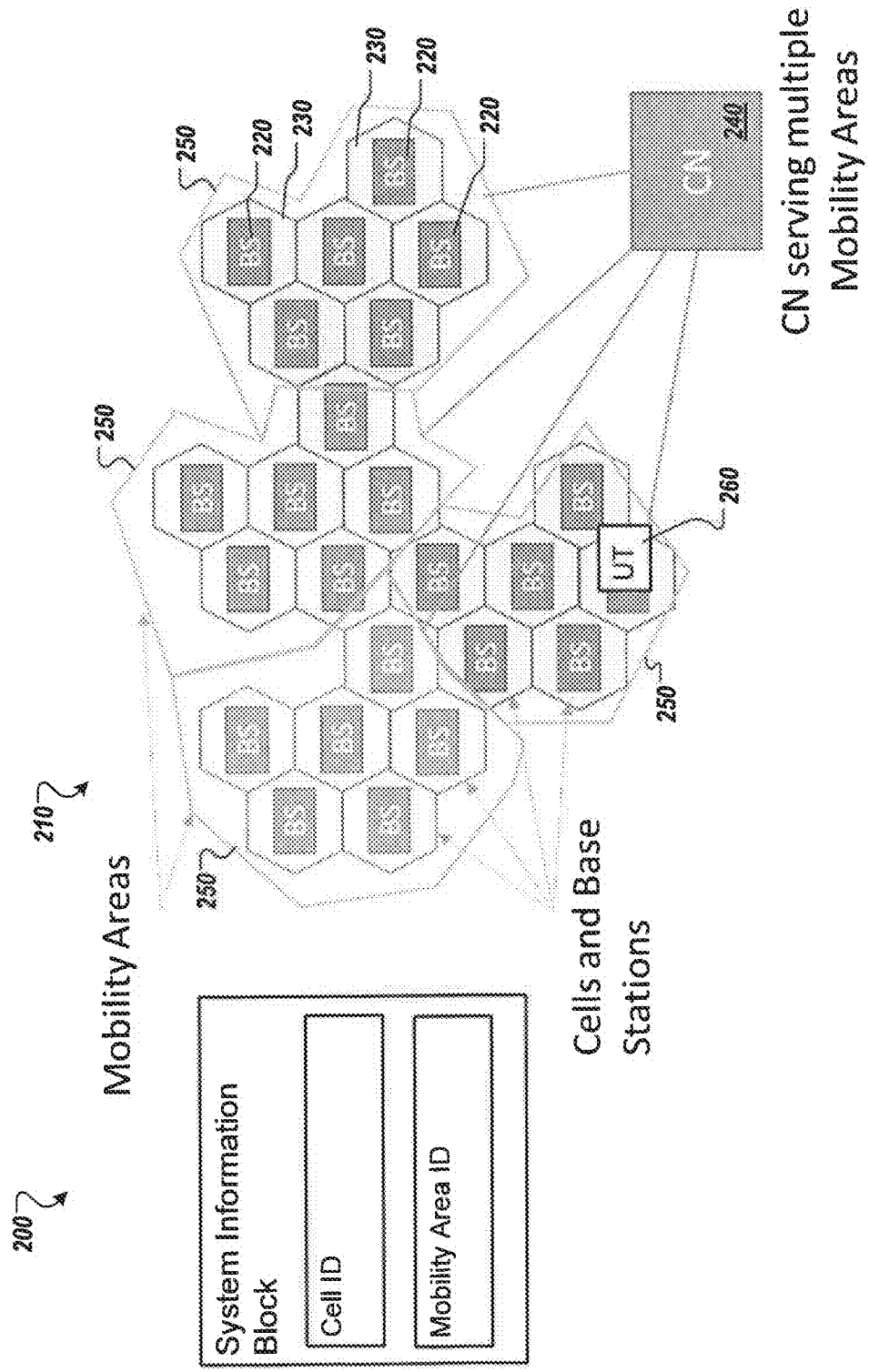
FIG. 2 is a diagram that shows an example of a terrestrial wireless system.

FIG. 2 is a diagram that shows an example of a terrestrial wireless system 200. In the example of FIG. 2, the terrestrial wireless system 200 includes a radio access network (RAN) 210, which includes a network of base stations (BS) 220, each providing service in a fixed radio cell 230. The base stations are connected by terrestrial backhaul to the core network (CN) 240. The core network defines mobility areas (MA) 250, each including a specific set of radio cells. Effectively, each mobility area 250 represents a geographic region defined by the union of the coverage areas of the radio cells that compose it.

The system 200 broadcasts information to help facilitate connections. A user terminal (UT) 260 located somewhere in the system is able to receive signals from one or more radio cells. Typically, the user terminal 260 selects or "camps on" the strongest signal that the user terminal 260 able to receive. The base station 220 for that cell 230 broadcasts information in system information blocks (SIBs) that include, among other things, the unique identifiers of the cell 230 (e.g., a Cell ID) and the mobility area 250 of which the cell 230 is a part. The user terminal 260 reads the mobility area ID from the SIB to determine which mobility area 250 it is currently located in. After selecting or having "camped on" a cell 230, the user terminal 260 performs an initial registration procedure to perform mutual authentication with the core network.

Figure 3A:
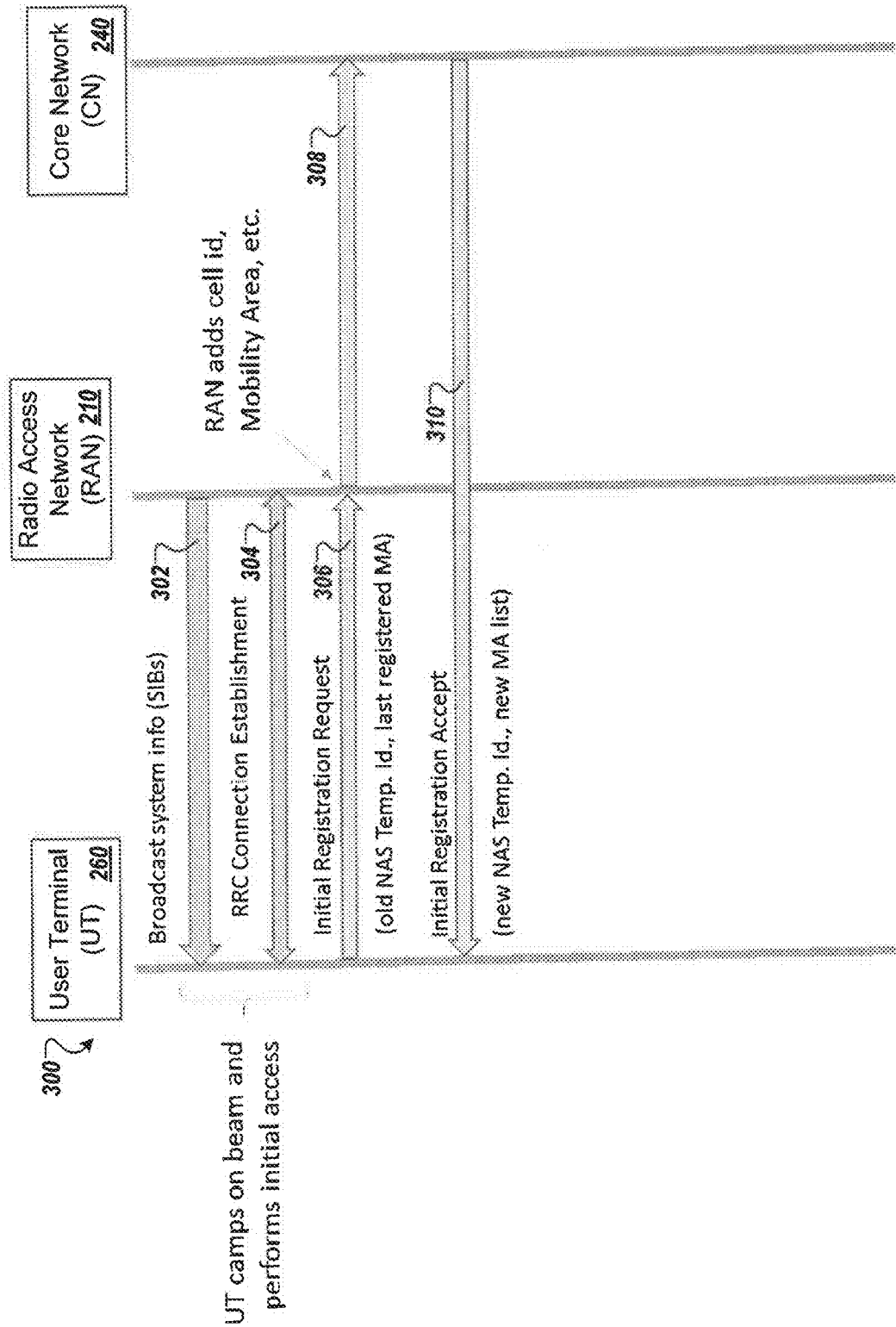
FIG. 3A is a flow diagram showing an example of an initial registration process in a terrestrial wireless system.

FIG. 3A is a flow diagram showing an example of an initial registration process 300 for the terrestrial wireless system 200. The initial registration process 300 enables the user terminal 260 to (1) perform mutual authentication with the core network 240, (2) obtain a NAS temporary identifier from the core network 240, and (3) register the current location (e.g., an indication of the current cell or mobility area) for the user terminal 260 with the core network 240.

In step 302, the radio access network 210 broadcasts system information, e.g., in system information blocks. In step 204, a radio resource control (RRC) connection is established between the user terminal 260 and the radio access network 210.

In step 306, the user terminal 260 provides, to its base station 230 in the radio access network 210), (i) the last NAS Temporary ID for the user terminal 260 (if available, otherwise the IMSI for the user terminal 260 is provided) and (ii) the user terminal's last registered mobility area (if known or available).

In step 308, the base station 230 forwards this to the core network along with the Cell ID and the Mobility Area of the current cell. Note that the radio access network 210, not the user terminal 260, determines the mobility area 250 in which the user terminal 260 is registering.

In step 310, the core network 240 responds to the user terminal 260 with (i) a new NAS Temporary ID for the user terminal 260, and (ii) a list of one or more mobility areas (e.g., a mobility area list) in which this user terminal 260 is allowed to move without having to perform a registration update.

After the procedure of FIG. 3A is complete, the core network 240 is aware that the user terminal 260 is registered in a specific mobility area. The core network 240 uses the location of the user terminal 260, expressed in terms of a mobility area identifier, to page the user terminal 260 when necessary, and also to control authorization to location-specific services, enforce lawful interception requirements, etc.

Figure 3B:
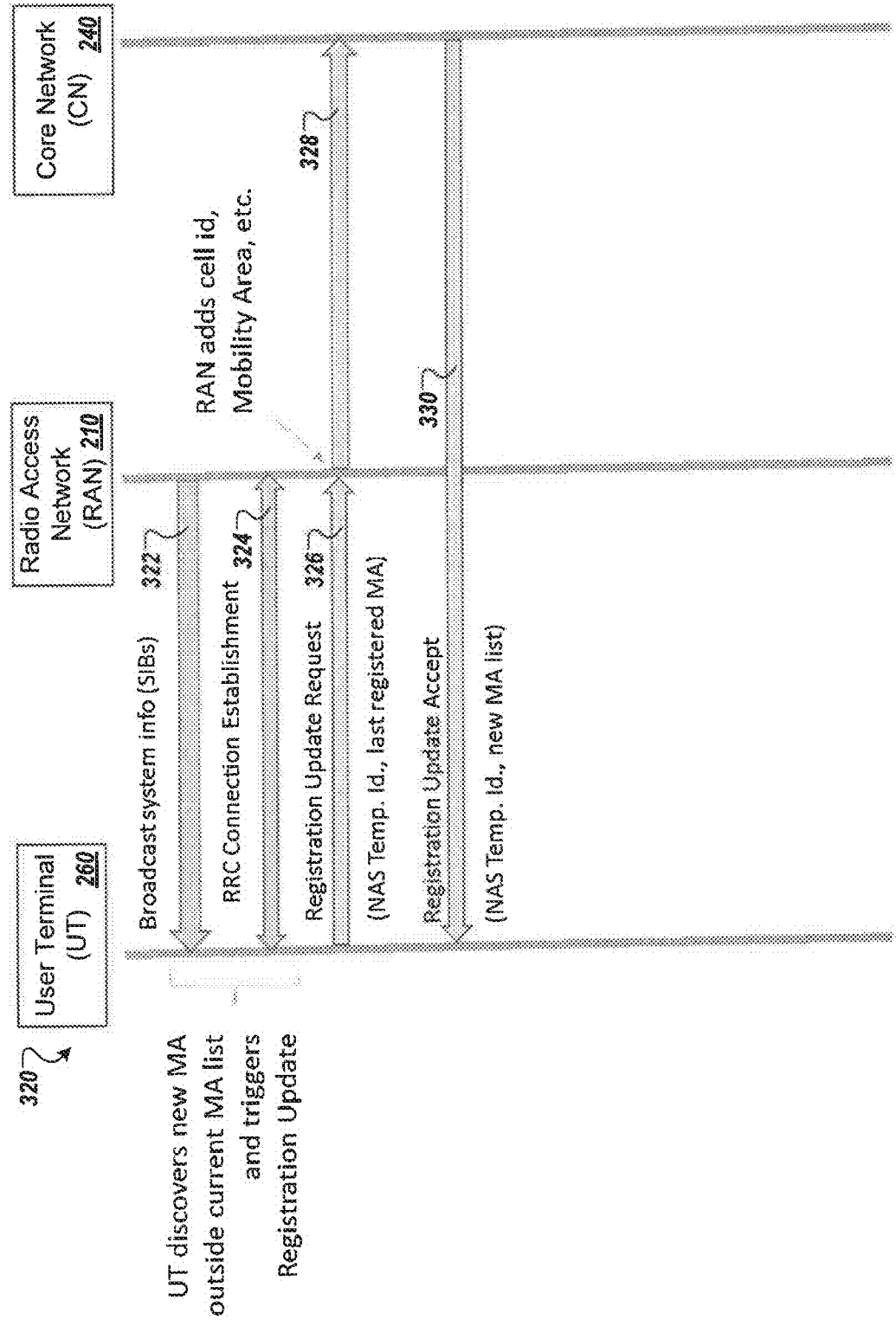
FIG. 3B is a flow diagram showing an example of a registration update process in a terrestrial wireless system.

FIG. 3B is a flow diagram showing an example of a registration update process 320 for the terrestrial wireless system 200. This process 320 may be performed while the user terminal 260 is idle. A mobile user terminal 260 may move out of range of its current cell 230 and into another cell 230. The user terminal 260 then repeats the process of selecting the best cell 230 and reads the mobility area 250 of the new cell 230 from the system information block (SIB) provided by the base station for the cell 230. If the mobility area 250 of the new cell 230 is not in the mobility area list provided by the core network 240 at the last registration, the user terminal 260 performs a registration update procedure to update the core network 240 with its new location, e.g., by providing its current mobility area identifier.

In step 322, the radio access network 210 broadcasts system information, e.g., in system information blocks. In step 304, a RRC connection is established between the user terminal 260 and the radio access network 210.

In step 326, the user terminal provides a registration update request. In this request, the user terminal 260 provides its last NAS Temporary ID and an identifier for its last registered mobility area.

In step 328, the base station 220 forwards this to the core network 240 along with the cell ID and the mobility area ID of the current cell 230. Note that the radio access network 210, not the user terminal 260, determines the mobility area 250 in which the user terminal 260 is registering.

In step 330, the core network 240 responds to the user terminal 260 with: (i) the NAS Temporary ID for the user terminal 260, which may be different from the one supplied by the user terminal 260 and a new list of one or more mobility areas 250 (e.g., a mobility area list) in which the user terminal 260 is allowed to move without having to perform a registration update.

Figure 3C:
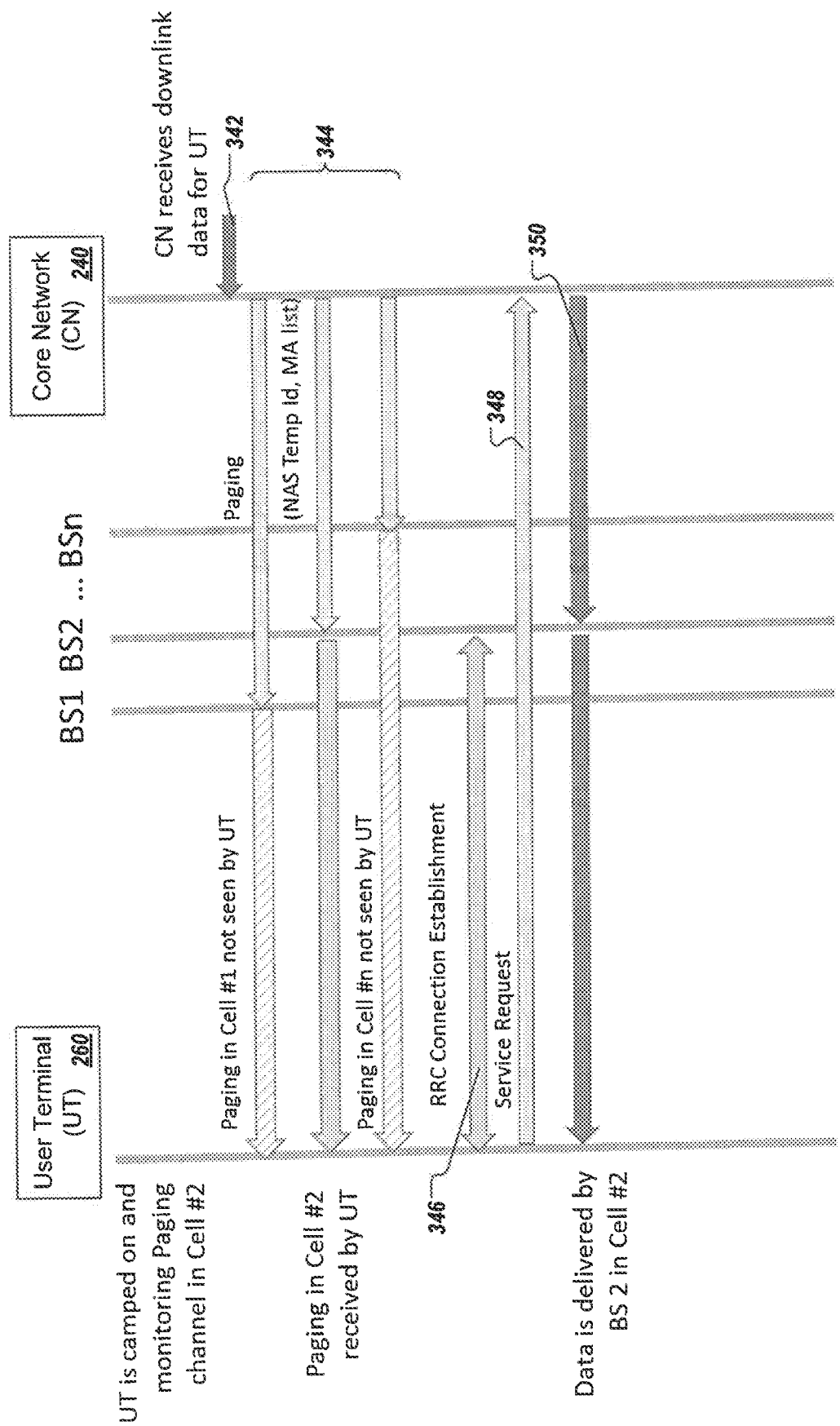
FIG. 3C is a flow diagram showing an example of a paging process in a terrestrial wireless system.

FIG. 3C is a flow diagram showing an example of a paging process 340 for the terrestrial wireless system 200. When the user terminal 260 is in PMM (packet mobility management) connected but RRC idle state, the core network 240 may receive incoming traffic (user data or signaling) to be delivered to the user terminal 260. The core network 240 then performs a paging procedure. For example, the core network 240 sends a paging request to every base station that is responsible for any of the cells 230 in the user terminal's last registered mobility area list. All of these base stations then broadcast a paging signal to the user terminal 260 in their respective cells 320, i.e. paging in all of the radio cells of the mobility area list. When in RRC idle state, the user terminal 260 periodically monitors the paging channel in its current cell 230, and thereby receives the paging message in one of these cells 320 and performs a system access procedure to receive its incoming traffic.

As shown in FIG. 3C, in step 342, the core network 240 receives downlink data for the user terminal 260. In step 344, the core network 240 sends a paging request to all of the base stations BS1-BSn in the mobility area list for the last registration of the user terminal 260. The base stations BS1-BSn each respectively attempt to provide the paging message to the user terminal 260. In the example, the paging message is received in the cell for base station BS2. As a result, in step 346, the base station BS2 and the user terminal 260 establish an RRC connection. In step 348, the user terminal 260 issues a service request to the core network 240 to request incoming data. In step 350, the core network 240 provides the downlink data through base station BS2.

Figure 4:
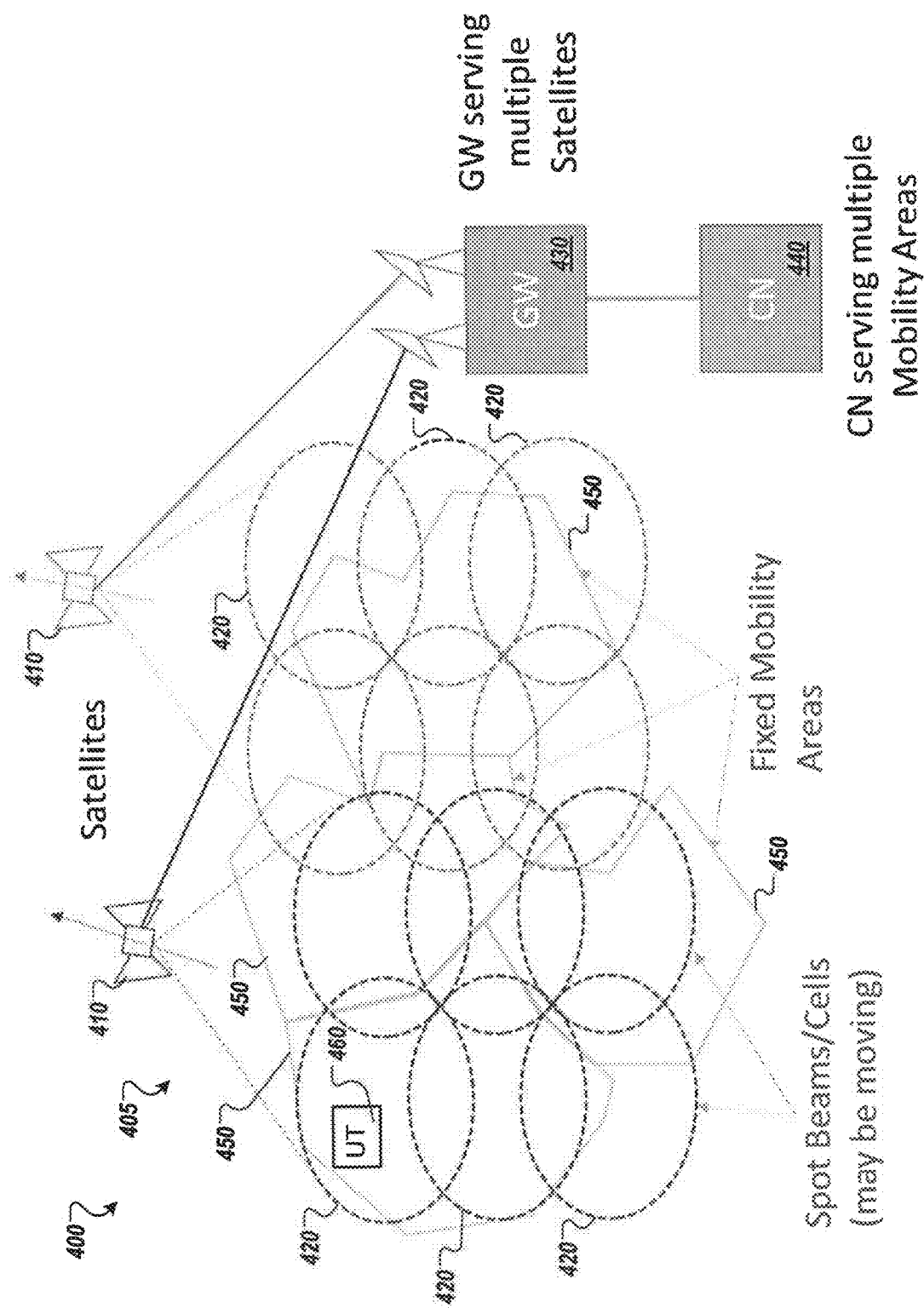
FIG. 4 is a diagram showing an example of a mobile satellite system.

FIG. 4 is a diagram showing an example of a mobile satellite system 400. In this example, satellites 410 and other infrastructure provide a radio access network 405 for communicating with a core network 440.

In a mobile satellite system (MSS), one or more satellites 410 project multiple spot beams 420 on the earth in the region being served by the system 400. These beams 420 can be considered cells, analogous to the cells 230 of the terrestrial cellular system 200. The system 400 includes a satellite base station subsystem (SBSS) or gateway (GW) 430 may control links to one or more satellites 410, and is connected by terrestrial backhaul to the core network (CN) 440. Like the terrestrial wireless system 200, mobility areas 450 representing fixed geographical regions are defined. In some cases, these mobility areas 450 can be the same mobility areas 250 that are defined for and used with terrestrial wireless cellular systems.

Note that although a different reference character is used for the core network 440 of FIG. 4 than is used for the core network 240 of FIG. 2, the system 400 can nevertheless be configured so the exact same core network can be used for both. In other words, the satellite system 400 can operate in a manner that is compatible with and transparent to a standard core network used with terrestrial cellular systems.

The characteristics of the mobile satellite system 400 present several challenges in implementing location and mobility management functions as they exist in terrestrial wireless systems. One of the challenges is mapping cells (e.g., satellite spot beams 420) to mobility areas 450. Mobility areas 450 are used by the core network 440 to control authorization to location-dependent services and implement regional lawful intercept requirements. Therefore, a mobility area 250 often needs to correspond to a fixed geographic region that could be defined by administrative requirements (e.g. country boundaries). In the terrestrial wireless network 200, a mobility area 250 is an aggregate of fixed cells 320, and so defines a fixed region on the ground. This is not the case for the beams 420 of the satellite system 400, which move with respect to the ground.

Satellite spot beams 420 are considerably larger than terrestrial radio cells (e.g., often hundreds or even thousands of kilometers across compared to a just few kilometers across for terrestrial cells) and overlap each other due to the more gradual roll-off characteristics of these beams 420. As a result, a spot beam 420 can cover multiple mobility areas 450. Furthermore, with non-geostationary orbit (NGSO) satellites, these beams 420 may be moving over the earth's surface at high speed (e.g. 6 km/sec or more for LEO satellites), thus making the relationship between cells and mobility areas 450 time-varying.

Given these considerations, there is no unique cell-to-mobility area mapping, so a fixed mobility area identifier cannot be broadcast in the system information block (SIB). Rather, the mobility area identifier would need to change over time. In addition, the user terminal 460 cannot simply read its current mobility area from the SIB in the current beam 420 used for communication. A special mechanism is needed for the user terminal 460 to determine its current mobility area.

Additional techniques can be used to improve paging efficiency in the system 400. In the conventional paging procedure, a user terminal 460 is paged in all the cells that are part of the user terminal's last registered mobility area list. In satellite systems, beams (e.g., cells) are very large and power and paging channel capacity are limited, so it is highly desirable to perform more precise paging, ideally only within the spot beam in which the user terminal 460 is actually located. Furthermore, it is desired that targeted paging be done without modifying the standards-based interfaces between the radio access network and the core network.

These considerations lead to a number of differences between the operation of the satellite system 400 and the terrestrial cellular system 200. To address these issues, the radio access network 405 can take over the responsibility of localizing the paging more precisely. The radio access network 405 can track, and typically also cache, the location of the user terminal 460 with sufficient precision to permit beam-level paging. The radio access network 405 can maintain context information for the user terminal 460 when in RRC idle state, and this context should be sufficient to identify and localize a user terminal 460 to the beam level for paging. The user terminal 460 can convey its position and identity to the radio access network 405 to support these functions. The radio access network can be able to determine which beam(s) contain the user terminal's last tracked location in order to perform precise paging.

In general, a mobile satellite system can use one of two major approaches to deal with the varying locations of user terminals and satellite beams 420. The first approach is for the satellite system 400 to update information about the locations of beams 420 with respect to mobility areas and to broadcast the updated information on a periodic or ongoing basis. The user terminal 460 can then use the information received from the system 400 to determine which beam 420 to use. The second approach is for the system 400 to determine a location for a user terminal 460, for example, through the user terminal 460 reporting its location or by the system 400 using triangulation and/or trilateration. The system 400 then uses information about known travel of the satellite beams 420 to vary which beams 420 are used to communicate with the user terminal 460 at different times. In both approaches, the system 400 can maintain and update a mapping between satellite beams 420 and mobility areas 450 as the beams move relative to the ground.

Both approaches can be used with any type of satellite system 400, e.g., with satellites 410 in LEO, MEO, or GEO. Nevertheless, the second approach of acquiring location information for user terminals may be preferred for LEO and MEO satellites 410 in some case, since these satellites move fast enough with respect to the ground that the beam coverage information changes very quickly. The first approach would require broadcasting updated beam coverage information on an ongoing basis, and the frequency that these updates would need to be sent may use a significant amount of bandwidth and thus reduce the efficiency of data communication over the channel. The two approaches will be discussed in more detail below.

Figure 5:
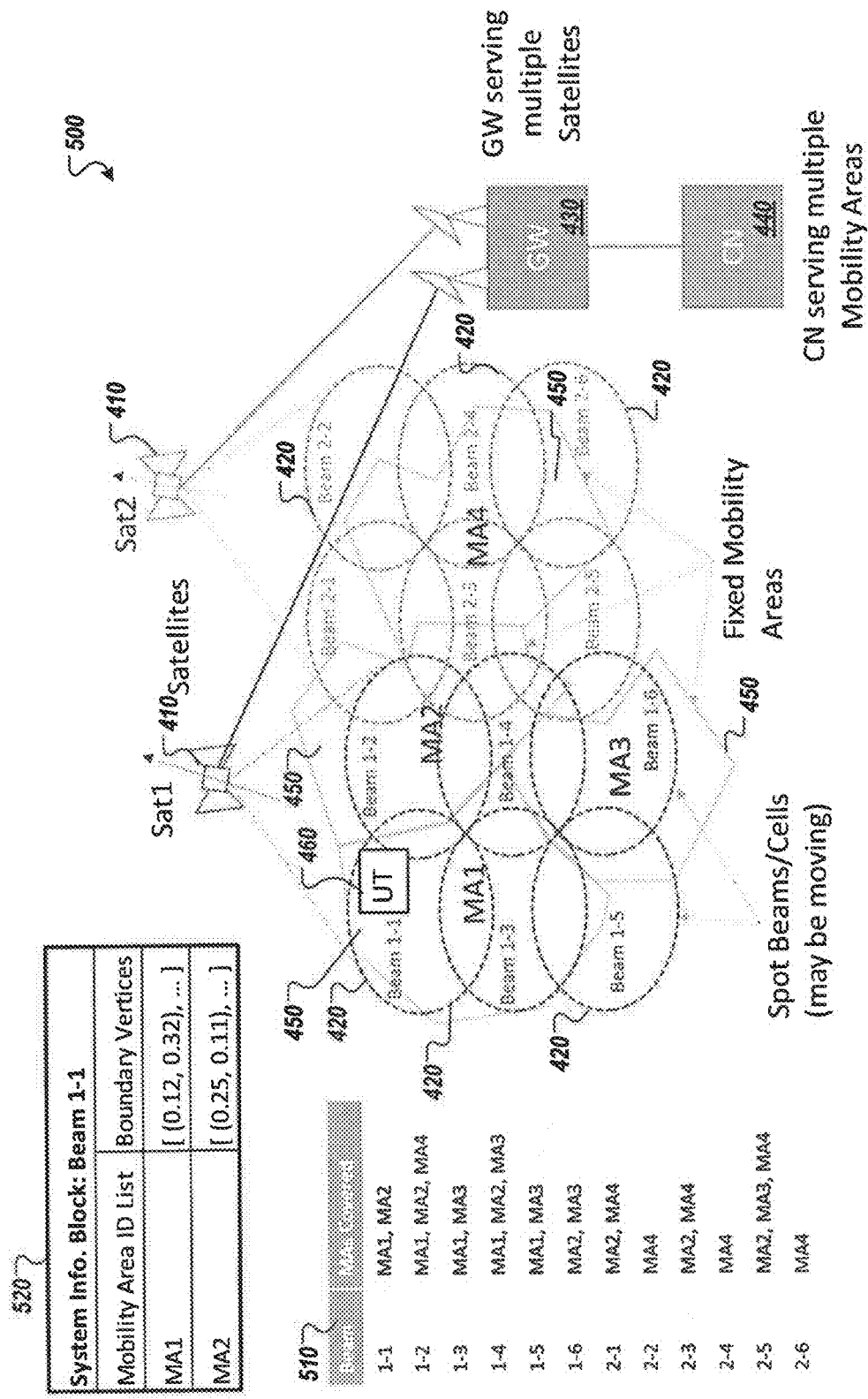
FIG. 5 is a diagram showing an example of broadcasting information indicating mobility areas corresponding to beams in a mobile satellite system.

FIG. 5 is a diagram showing an example of broadcasting information indicating mobility areas 450 corresponding to beams 420 in the mobile satellite system 400. In the example, the system 400 broadcasts mobility area boundaries to user terminals, allowing each user terminal 460 to determine which mobility area 450 the user terminal 460 is in.

The system 400 includes a controller for the radio access network 450, e.g., one or more computers, that manages and updates a mapping 510 between satellite beams 420 and mobility areas 450. Often, the controller is integrated with or otherwise associated with the gateway 430. The controller determines all of the mobility areas 450 covered (in whole or part) by each beam 420. The information in the mapping 510 can then be stored in a table, cache, file, or any other appropriate manner to associate beam identifiers with corresponding identifiers for mobility areas 450.

The controller then causes the satellites to transmit, in each beam 420, an indication of the boundaries of the mobility areas 450 that the beam 420 at least partially covers. For example, each beam 420 can transmit, in a system information block (SIB) 520 of the beam 420, data indicating the mobility areas determined to be covered by the beam 420 and the polygon vertices of each of those mobility areas. In the illustrated example, the user terminal 460 is in the area of Beam 1-1, and the SIB 520 indicates the two mobility areas 450, labeled MA1 and MA2, that are at least partially covered by Beam 1-1. The SIB for Beam 1-1 also indicates the boundaries of these mobility areas, e.g., as coordinates of vertices of polygons defining the boundaries, or in another form. Each of the other beams 420 also transmit a SIB, but will often indicate different sets of mobility areas 450 covered, with the corresponding mobility area boundaries, because different beams often span different sets of mobility areas 450.

If the beams 420 are moving (e.g., for a MEO or LEO system), the controller for the radio access network 405 recalculates and updates this mobility area information in the mapping 510 periodically and causes the updated information to be transmitted in the SIBs for the beams 420.

The user terminal 460 determines its own location, e.g., through a GPS receiver or through other means. The user terminal 460 reads the SIBs periodically and determines which of the mobility areas 450 identified in the most recent SIB contains its own current location. The user terminal 460 may consistently maintain a good measurement or estimate of its current position to allow accurate determination of the current mobility area 450 for the user terminal 460.

If the beams 420 are moving, then the current beam 420 will eventually move away from the user terminal 460 and the mobility areas 450 indicated in broadcast in that beam's SIBs will cease to cover the user terminal's location. If the user terminal's current location does not lie within the mobility areas identified in the SIBs of the current beam, then the user terminal 460 can detect this condition and reselect a different beam that provides better coverage. With the re-selected beam 420, the user terminal 460 can then locate or verify the current mobility area for the user terminal 460.

Broadcasting the mobility area list and the vertices of each mobility area can also be useful in GEO satellite systems, as well as in MEO and LEO systems. For example, in a GEO system, even though the beams may not be moving, a spot beam 420 may still span across several mobility areas 450 and so a user terminal 460 still needs to use its current position to determine which of several mobility areas 450 it is located in. For example, this may be used to determine where the lawful intercept point for a particular user terminal 460 should be based on its location in the beam 450.

Figure 6:
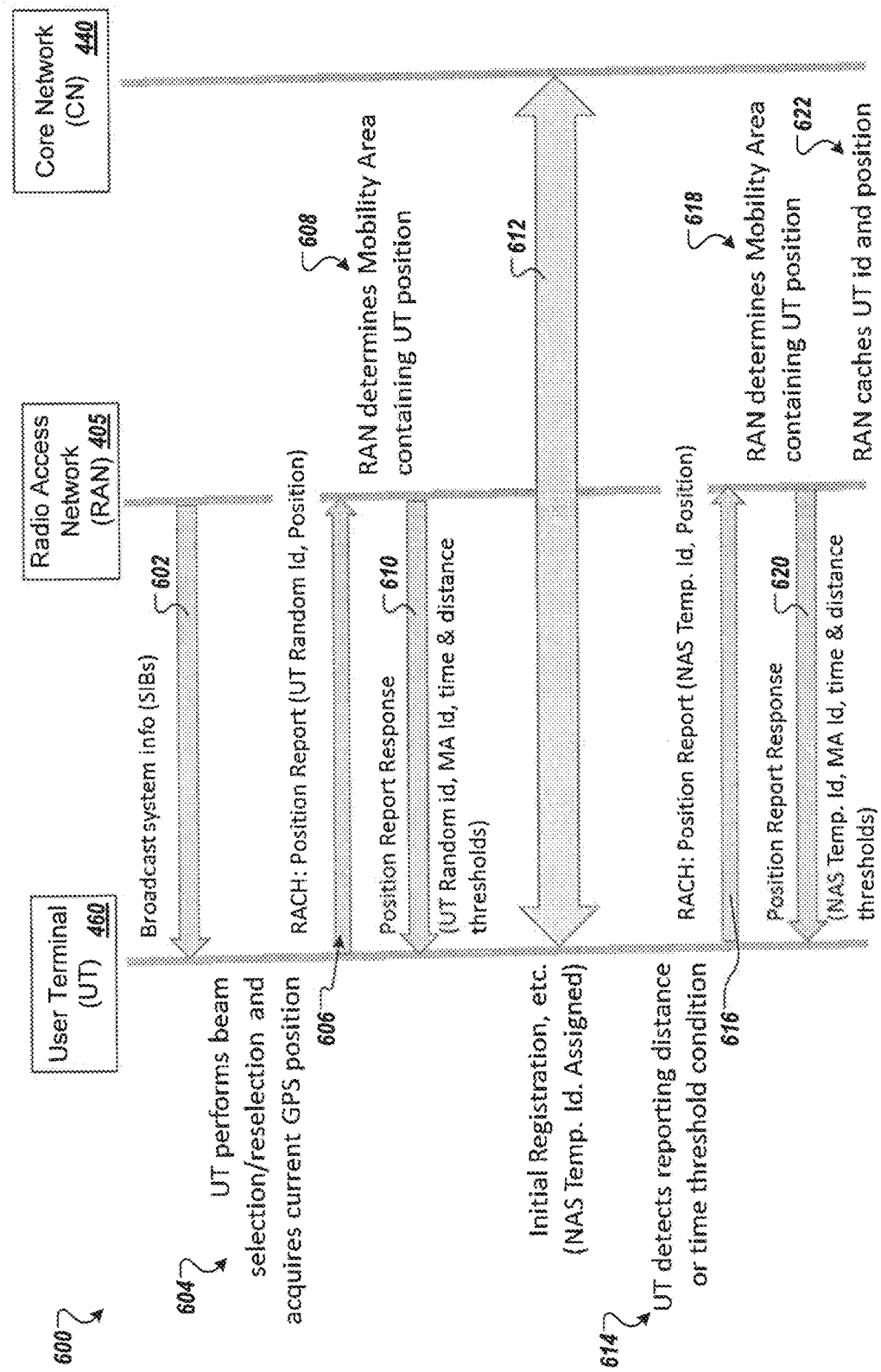
FIG. 6 is a flow diagram showing an example of an explicit position reporting process for a user terminal in an idle state, using a mobile satellite system.
Figure 7:
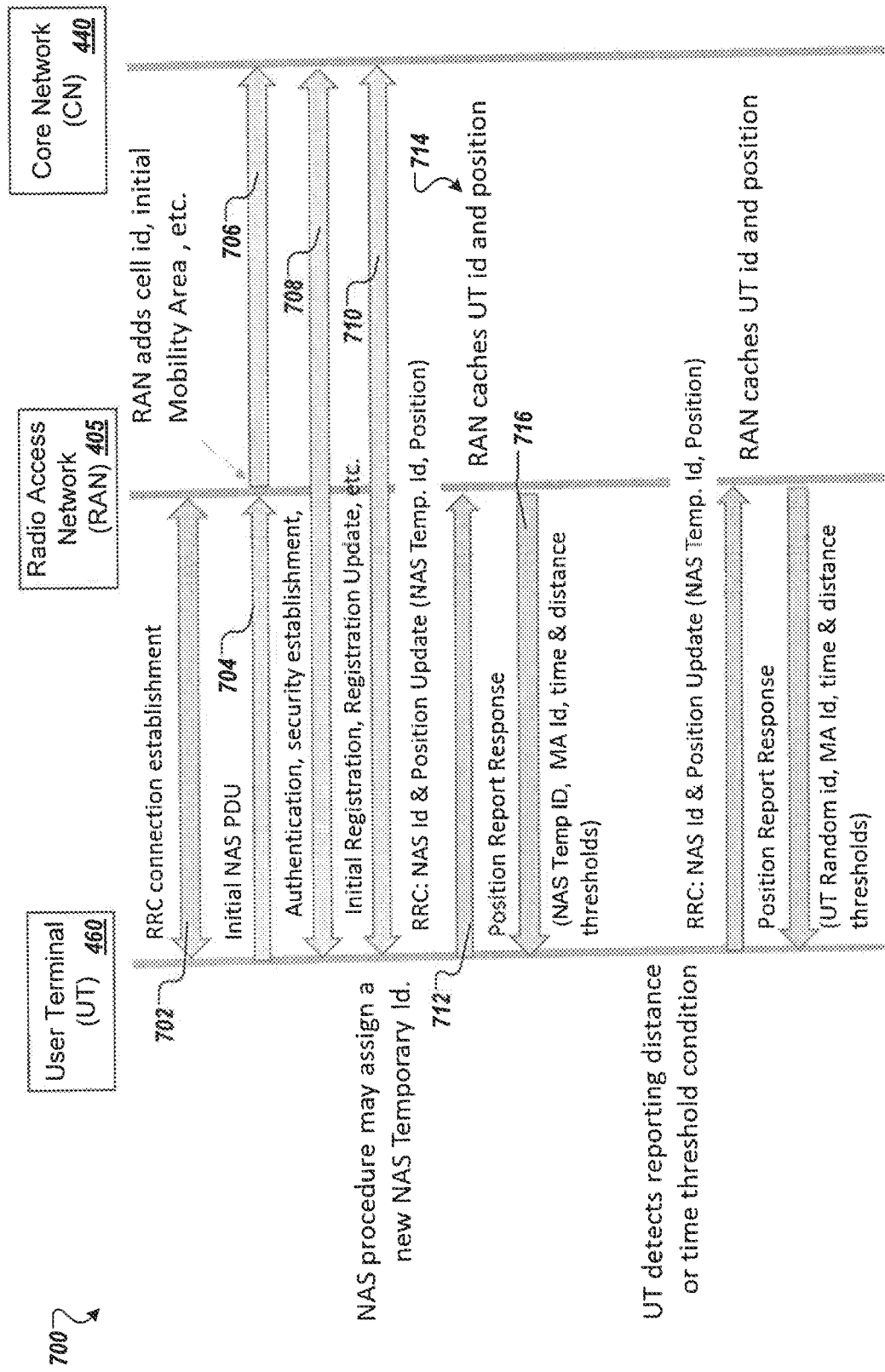
FIG. 7 is a flow diagram showing an example of an explicit position reporting process for a user terminal in a connected state, using a mobile satellite system.
Figure 8:
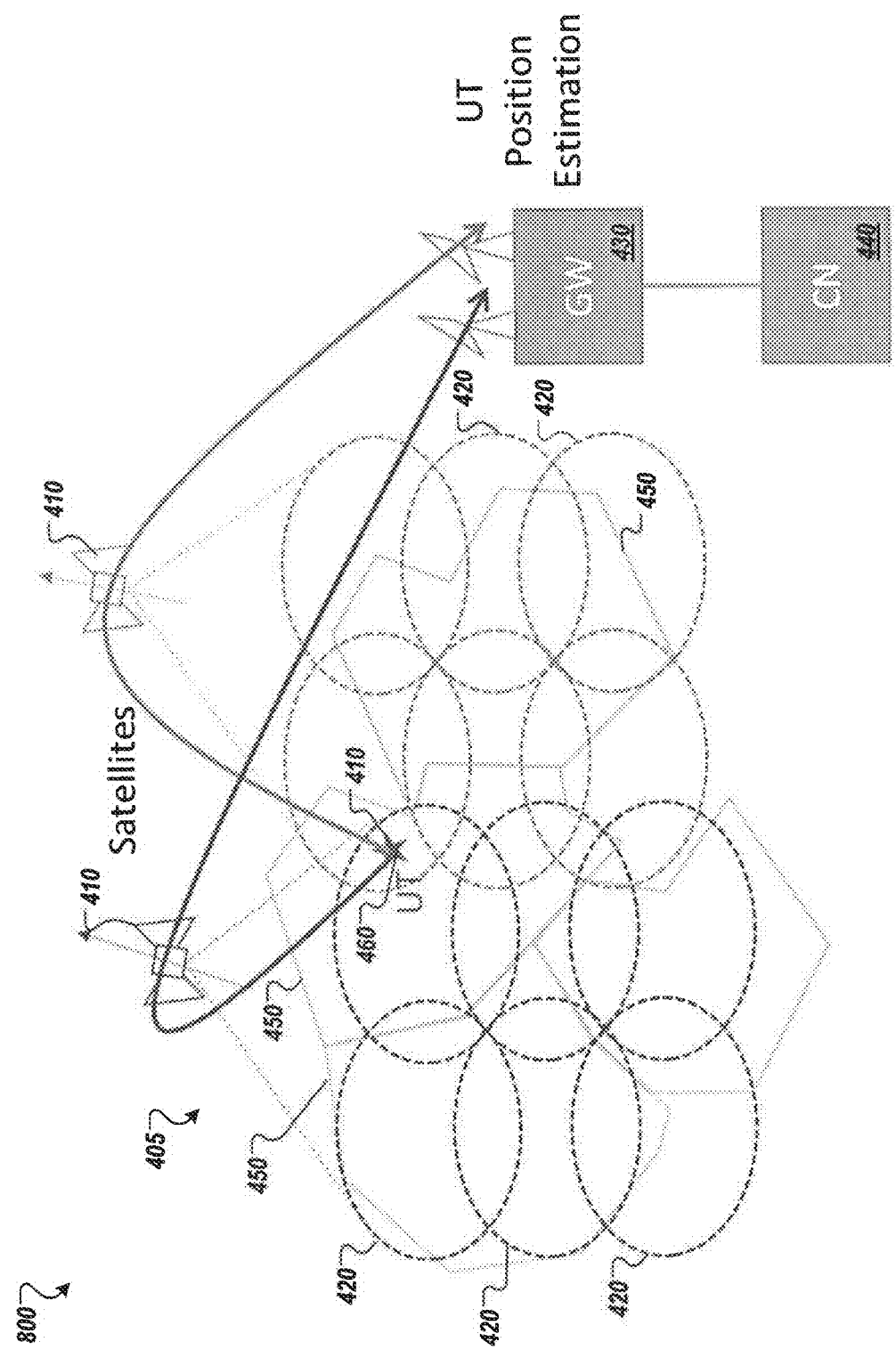
FIG. 8 is a diagram showing an example of estimating a position of a user terminal using a mobile satellite system.

FIGS. 6, 7, 9, and 10 show techniques that involve user terminals determining and reporting their locations to the radio access network 405. When the radio access network 405 can rely on user terminals to provide their locations and update the location information when the user terminals move, the radio access network 405 can determine the appropriate mobility area 450 for each user terminal 460 and provide that information to the user terminals. FIG. 8 shows a technique in which a user terminal 460 does not explicitly specify its location, but provides a signal that allows the radio access network 405 to implicitly determine the location of the user terminal 460.

In some implementations, the satellite system 400 can determine the mobility area 450 corresponding to the user terminal 460 and transmit an identifier for the mobility area 450 to the user terminal 460. Rather than send information about multiple mobility areas corresponding to a beam 420 and letting the user terminal 460 determine its mobility area 450, the controller of the radio access network 405 can determine the mobility area 450 for the user terminal 460.

The user terminal 460 determines its location, and then provides data indicating its location to the radio access network 405. The controller for the radio access network 405 looks up the corresponding mobility area 450 that includes the location that the user terminal 460 indicated. The controller then transmits data identifying the correct mobility area 450 to the user terminal 460. This technique uses a position reporting mechanism for the user terminal 460, so the user terminal 460 can convey its position to the radio access network 405. Several different techniques can be used to achieve this location reporting by the user terminal 460, discussed further below.

User terminal 460 position reporting mechanisms can be useful for several different reasons. For example, in the absence of mobility area information being broadcast in the SIBs, the radio access network 405 can use the reported user terminal 460 position to look up the user terminal's current mobility are 450 and inform the user terminal 460 of that mobility area. The radio access network 405 can use the reported position to validate whether the user terminal 460 is in a supported location, outside the current beam, service area, etc., and then issue an appropriate response (e.g., to reject connection, redirect to another beam, etc.). The radio access network 405 can cache the user terminal 460 position along with the user terminal's unique identification to support precise paging. In some implementations, the radio access network 405 can report the estimated position back to the user terminal 460, if the user terminal 460 does not have its own position estimate (e.g. via GPS). The radio access network 405 can also use a reported position for system synchronization, handover prediction, and other system functions.

When the system 400 is configured for the user terminal 460 to explicitly indicate its location, the user terminal 460 measures its own position (e.g., using GPS) and maintains the information current by updating the position if it moves. The user terminal 460 transmits data indicating its identity and its current position to the radio access network 405. Position reporting in this way can be done in an RRC idle state (i.e., without establishing an RRC connection) as shown in FIG. 6, or in an RRC connected state (i.e., in the context of an established RRC connection) as shown in FIG. 7.

When used in RRC idle state, this procedure is useful for mobility area detection when the user terminal 460 has just camped on a new beam (e.g., initial beam selection or beam reselection).

When user terminals report the user terminal's identity and location, it may often be desirable to obscure the information so it is not transmitted clear and visible to potential eavesdroppers. Typically, this is a concern only when the user terminal 460 transmits this information prior to establishment of access stratum (AS) level security (e.g., ciphering and integrity protection), e.g. in RRC idle state. For transmissions in the RRC idle state, or whenever the communication protocols don't provide security, the user terminal 460 and the radio access network 405 can encrypt the information, e.g., using asymmetric key encryption (FIG. 9) or symmetric key encryption (FIG. 10).

FIG. 6 is a flow diagram showing an example of an explicit location reporting process for a user terminal 460 in an RRC idle state, using the mobile satellite system 400.

In step 602, the radio access network 405 broadcasts system information blocks. In step 604, the user terminal 460 selects an appropriate satellite beam 420 and determines its position, e.g., using a GPS receiver. The user terminal 460 determines its position for initial registration and whenever the user terminal 460 in an RRC idle state has moved beyond a predetermined distance, e.g., a value "D_reporting," from its previously reported position. Typically, the previously reported position is the last position that was reported to the radio access network 405 for the user terminal 460, whether in an idle or connected state, in a message to which the radio access network 405 sent a response indicating that the message was received correctly.

In step 606, the user terminal 460 transmits a position report message on a random access channel (RACH) procedure to the radio access network 405. The message that the user terminal 460 sends to report its position includes the user terminal's identifier (e.g., a NAS temporary identifier, if that is known, or otherwise a random identifier) and the user terminal's current position (e.g., GPS coordinates).

In step 608, the controller for the radio access network 405 determines the mobility area 450 that includes the reported position of the user terminal 460. In step 610, the radio access network 405 provides a position report response message to the user terminal 460, indicating the user terminal random identifier (e.g., from the position report message from the user terminal 460), the mobility area identifier for the current mobility area of the user terminal 460, and time and distance thresholds that should be used to trigger further position reporting by the user terminal 460. In the normal case, the radio access network 405 replies with the mobility area identifier in which the user terminal's reported position is located. As noted above, the controller for the radio access network 405 can store data indicating the boundaries of the mobility areas 450 and use that stored data to look up which mobility area 450 the user terminal 460 location falls within. The reply from the radio access network 405 can include optional additional information also, such as a position reporting distance threshold, D_reporting, and/or a time reporting threshold, T_reporting. These thresholds can specify for the user terminal 460 that an updated report of the user terminal's location should be provided if either the user terminal 460 moves farther than the distance threshold or an amount of time elapses that exceeds the time threshold. Each user terminal 460 can track distance traveled and time elapsed to determine when to initiate a new position report.

In an error case, the radio access network 405 may provide other information in the response, such as a cause code if the user terminal 460 is outside the service area, or information directing the user terminal 460 to disconnect or to access a different beam.

If the message from the user terminal 460 to the radio access network 405 contained a NAS temporary identifier, then the radio access network 405 can cache this information to update its last known reported position for the user terminal 460. Note that if the message from the user terminal 460 contained a random identifier, the radio access network 405 generally cannot identify the user terminal 460 in idle state, and therefore does not need to cache the position information. When the user terminal 460 is assigned a NAS temporary identifier, the user terminal 460 will update the radio access network 405 again using the newly assigned NAS temporary identifier, as discussed further below.

An initial mobility area for a user terminal 460 can be determination by the radio access network 405 during or upon establishment of an RRC connection. At RRC connection establishment, the radio access network 405 establishes an initial user terminal context and transfers the first NAS message (e.g., Registration, Service Request, etc.) from the user terminal 460 to the core network 440. At this context establishment, the radio access network 405 also determines the mobility area 450 in which the user terminal 460 is located when the user terminal 460 is establishing the RRC connection. The radio access network 405 conveys the determined mobility area 450 to the core network along with the first non-access stratum (NAS) protocol data unit (PDU). One or more of the following methods may be used in order for the radio access network 405 to determine this initial mobility area identifier. For example, the RRC establishment request can indicate the user terminal 460 position, explicitly or implicitly. The radio access network 405 can then look up the corresponding mobility area identifier. As another example, the RRC establishment request can include the mobility area identifier previously provided to the user terminal 460 by the position reporting procedure in RRC idle state. As another example, the radio access network can guess or estimate the initial mobility area identifier (e.g., based on the beam center, previously cached information, or some other heuristic) for the RRC connection establishment. Note that once the connection is established and the user terminal 460 reports its position in the RRC connected state, if the mobility area is not appropriate, a handover to the correct mobility area can be done if necessary.

In step 612, the user terminal 460 and the core network 440 perform an initial registration, in which, for example, a new NAS temporary identifier is assigned. In step 614, the user terminal 460 detects that it has reached one of the time or distance thresholds to trigger additional position reporting. In step 616, the user terminal 1024 sends an additional position report message with its current position. In step 618, the radio access network 405 determines the current mobility area of the user terminal 460. In step 620, the radio access network 405 sends a position report response. In step 622, the radio access network 405 caches the use terminal's identifier and most recently reported position, as it may do after every position report from the user terminal 460.

FIG. 7 is a flow diagram showing an example of an explicit position reporting process 700 for a user terminal 460 in an RRC connected state, using the mobile satellite system 400.

FIG. 7 shows, in step 702, RRC connection establishment between the user terminal 460 and the radio access network 405. In step 704, the user terminal send an initial non-access stratum (NAS) protocol data unit (PDU). In step 706, the radio access network 405 adds a cell identifier, and an initial mobility area identifier, and other information and transmits the PDU and added data to the core network 440. In step 708 the user terminal 460 and the core network 440 complete authentication and establish security. In step 710, the user terminal and the core network 440 perform initial registration. This step may alternatively represent a registration update or other change to registration.

In step 712, after initial ATTACH procedure, when the user terminal 460 is first assigned a NAS temporary identifier, and then subsequently, when this identifier is reassigned, the user terminal 460 uses the NAS temporary identifier and position update procedure to update the radio access network 405 of the user terminal's NAS temporary identifier and optionally, its current position. This procedure occurs in the RRC connected state, because usually the user terminal 460 receives a new NAS Temporary Identifier through a signaling procedure with the core network 440, while it is connected to the radio access network 405.

This procedure may also be used to inform the radio access network 405 of a new position, if the user terminal 460 is in RRC connected state when the user terminal 460 has moved beyond the distance threshold for reporting, D_reporting, from its previously reported position.

The NAS temporary identifier and position update message includes the user terminal's NAS temporary identifier, and optionally, the user terminal's new position.

In step 714, the radio access network 405 can cache the identifier and position of the user terminal 460 as most recently reported.

In step 716, the radio access network 405 provides a position report response to the user terminal 460. A normal response from the radio access network 405 indicates that the user terminal's position has been cached and the user terminal 460 can update its last reported position. The response may also include additional information, such as the position reporting distance and time thresholds, etc. Further reporting and updating can also occur as shown, similar to what is described for the corresponding elements of FIG. 6.

FIG. 8 is a diagram showing an example of estimating a position of a user terminal 460 using the mobile satellite system 400. In addition to or as an alternative to user terminals determining and reporting their own locations, the radio access network 405 can use information from multiple satellites 410 to infer or estimate the position of user terminals. With this method, a user terminal 460 transmits a signal such that the radio access network 405 can receive it through multiple satellites 410, and use triangulation/trilateration methods to estimate the user terminal's location.

Triangulation involves estimating the angle between the user terminal's line-of-sight vector to a satellite 410 with the satellite's velocity vector based on the observed Doppler shift in the received signal. Trilateration involves estimating the distance between the user terminal 460 and the satellite 410 based on the observed propagation delay in the received signal. Combinations of these observations through multiple satellites 410 can be used to obtain a sufficiently accurate estimate of the user terminal's location.

The signal that the user terminal 460 transmits to facilitate position estimation can also contain useful information in its payload, such as (i) a user terminal 460 identifier, and/or (ii) transmit time and frequency offset parameters useful in the estimation process.

One advantage of implicit position transfer is that it avoids transferring the user terminal's position in unencrypted form, which provides enhanced privacy.

Figure 9:
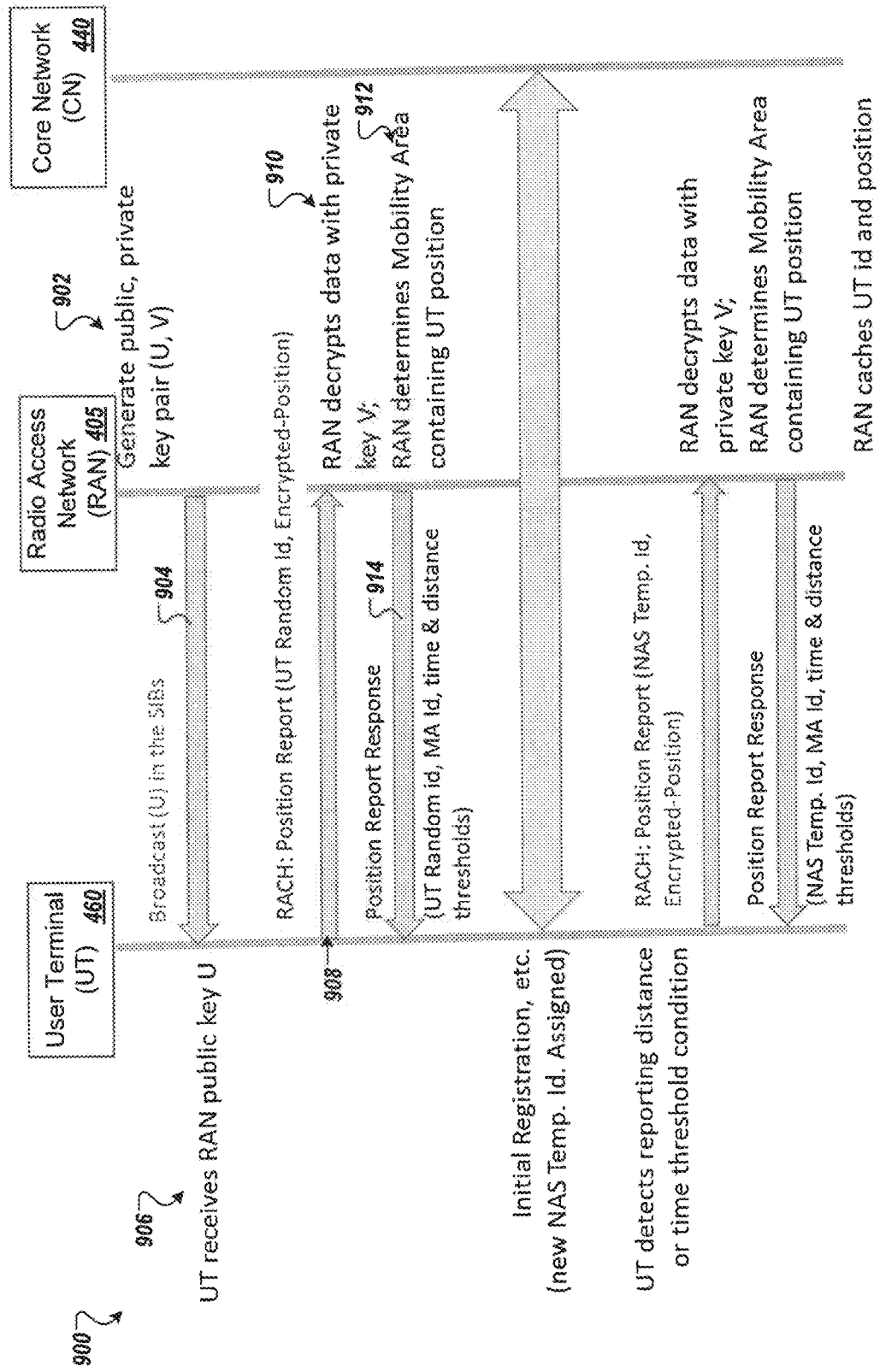
FIG. 9 is a flow diagram showing an example of secure reporting of user terminal position for a mobile satellite system, using asymmetric key encryption.
Figure 10:
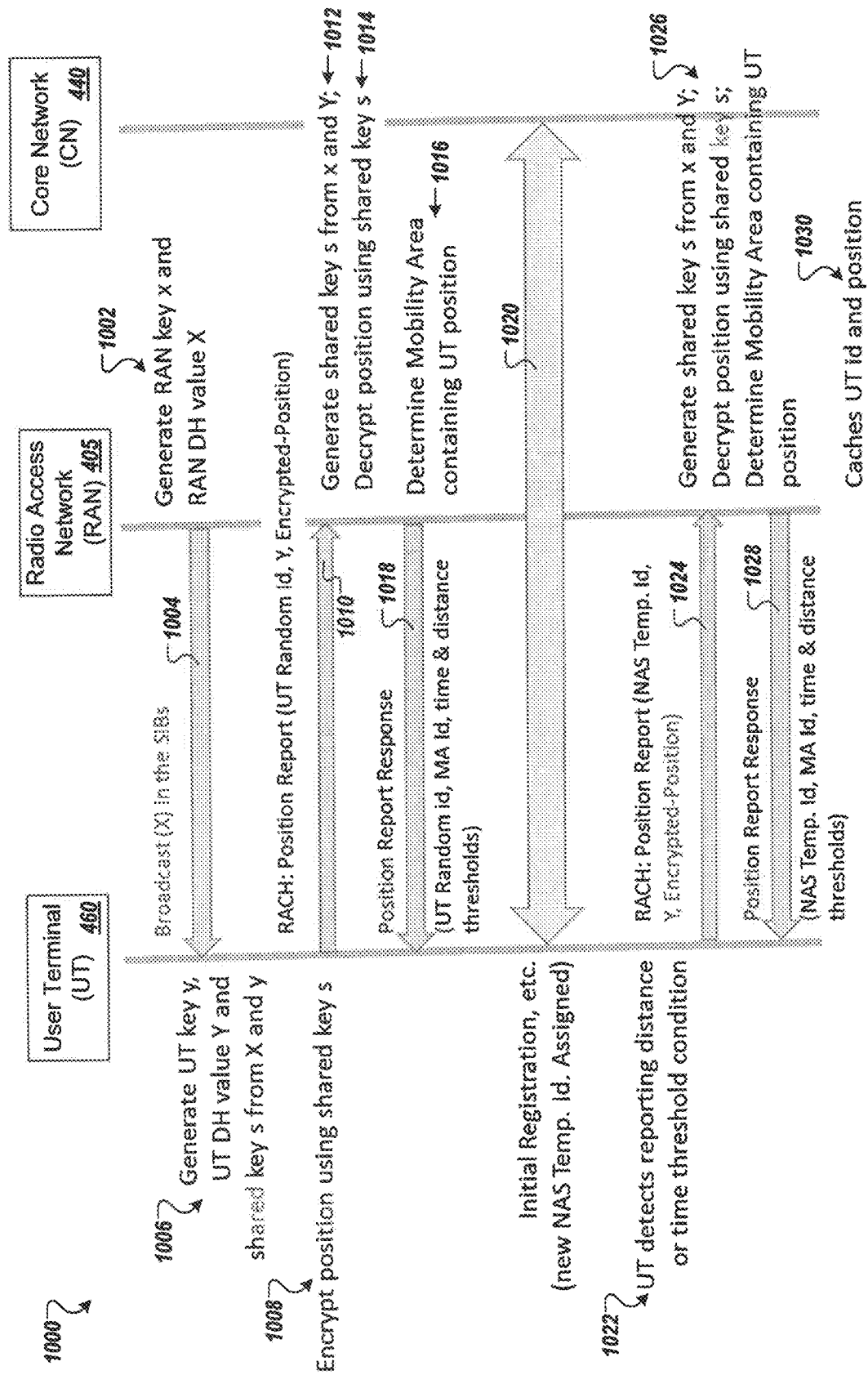
FIG. 10 is a flow diagram showing an example of secure reporting of user terminal position for a mobile satellite system, using symmetric key encryption.

FIG. 9 is a flow diagram showing an example process 900 of secure reporting of user terminal 460 position for the mobile satellite system 400, using asymmetric key encryption.

In some applications, there may be a privacy concern related to revealing a user terminal's position in clear by transmitting it to the radio access network 405 prior to establishment of RRC security. This applies to the position reporting in the RRC idle state procedure described earlier, and perhaps also to the procedure in the RRC connected state, if that is done before establishment of application server (AS) layer security.

One method of securely providing the user terminal's position information uses a public key for the radio access network 405. This method uses an asymmetric cipher and a single radio access network-generated key to protect transmissions from the user terminal 460 to the radio access network 405.

In step 902, the radio access network 405 periodically generates a (public, private) key-pair (U, V) using some random input as a generator (for example, K-enb may be used). The "public key" is defined by a modulus n and a public exponent e. The "private key" is defined by the modulus n and a private exponent d.

In step 904, the radio access network 405 advertises (e.g., broadcasts) the public key U in the system information (SIBs) for the beams 420. The same public key U can be broadcast to multiple user terminals, e.g., to all terminals in a beam, in terminals in multiple beams, or even across multiple satellites.

In step 906, the user terminal 460 reads the radio access network's public key U from the SIBs along with other system information. In step 908, the user terminal 460 reports its position in an encrypted form. When the user terminal 460 transmit its position, the user terminal 460 uses the latest radio access network public key U to encrypt the sensitive position information element. The sensitive information can be padded with random "salt" to help defeat dictionary attacks and avoid revealing patterns in the data.

Encrypting a message m can include computing a modular exponent as shown in the equation below.

$$m'=(m^e) \bmod n$$

Only the radio access network 405 can decrypt the content that was encrypted, because only the radio access network 405 has private key V. Decrypting a message m' includes computing the modular exponent as shown in the equation below.

$$m=(m'^d) \bmod n$$

In step 910, the radio access network 405 decrypts the location data using private key V. In step 912, the radio access network 410 determines which mobility area 450 includes the user terminal's reported position. In step 914, the radio access network 405 provides a position report response, as discussed above, which can include an identifier for the user terminal 460, the mobility area identifier for the identified mobility area, and time and distance thresholds. Registration can then be performed with the core network 440, and later position reporting updates can also use the public key U to encrypt terminal location information.

To help synchronize the key versions, the version of the SIB data from which the radio access network public key was taken may also be included in the message. Due to the computational expense of public key cryptography, asymmetric key encryption may be used only for small information elements, and only until AS layer security has been established. This technique provides the advantage of being simple and efficient in using broadcast resources, since a single key can be used by all user terminals. However, compromise of the radio access network private key could expose all user terminal 460 positions encrypted using that key. To mitigate this risk, a separate key per user terminal 460 may be used instead, as discussed with respect to FIG. 10.

FIG. 10 is a flow diagram showing an example process 1000 of secure reporting of user terminal position for the mobile satellite system 400, using symmetric key encryption. This method uses the Diffie-Hellmann protocol to generate a shared encryption key for each user terminal 460, and then uses symmetric key encryption to protect the sensitive data.

In step 1002, the radio access network 405 periodically generates a private key x using some random input as a generator (for example, K-enb may be used). The radio access network 405 also calculates the Diffie-Hellmann (DH) value X=(g^x mod p) where g and p are known Diffie-Hellmann parameters previously agreed for the system 400.

In step 1004, the radio access network 405 advertises radio access network DH value X in the system information (SIBs) for the beam 420.

In step 1006, the user terminal 460 reads the radio access network's DH value X from the SIBs along with other system information. To transmit its position securely, the user terminal 460 does the following. The user terminal 460 calculates a private user terminal key y using a random generator (for example, a suitable key from the SIM), and a user terminal DH value Y=(g^y mod p). The user terminal 460 calculates the shared user terminal key s=(X^y mod p)=(g^xy mod p).

In step 1008, the user terminal 460 uses the shared keys to encrypt the sensitive position information element using a suitable symmetric cipher. The sensitive information can be padded with random "salt" to help defeat dictionary attacks and avoid revealing patterns in the data. In step 1010, the user terminal 460 transmits the user terminal identifier, user terminal DH value Y, and the encrypted position to the radio access network 405.

The radio access network 405 can derive the shared key and decrypt the message content as follows. In step 1012, the radio access network 405 generates the shared key s=(Y^x mod p)=(g^yx mod p). In step 1014, the radio access network 405 decrypts the position using the shared key s. In step 1016, the radio access network 405 determines the mobility area 450 that includes the user terminal's position, as just reported. In step 1018, the radio access network 405 transmits a position report response to the user terminal 460, indicating the user terminal random identifier (e.g., from the position report message from the user terminal 460), the mobility area identifier for the current mobility area of the user terminal 460, and time and distance thresholds that should be used to trigger further position reporting by the user terminal 460.

To help synchronize the key versions, the SIBs can include a version code that is incremented or otherwise changed each time the radio access network public key, e.g., the DH value X, changes. The position report messages from the user terminal 460 can include the version code indicating the version of the SIB data from which the radio access network public key was taken.

In step 1020, the user terminal 460 and the core network 440 perform an initial registration, in which, for example, a new NAS temporary identifier is assigned. In step 1022, the user terminal 460 detects that it has reached one of the time or distance thresholds to trigger additional position reporting. In step 1024, the user terminal 1024 sends an additional position report message with its current position provided in encrypted form. Additional position reporting by the user terminal 460 can use the same symmetric key determined earlier or a new shared key. In step 1026, the radio access network 405 again generates the appropriate shared key s, decrypts the user terminal position using the shared key s, and determines the mobility area of the user terminal 460. In step 1028, the radio access network 405 sends a position report response. In step 1030, the radio access network 405 caches the use terminal's identifier and most recently reported position, as it can do after every position report from the user terminal 460.

In addition to the techniques discussed above, other variations can be used. For example, in some implementations, the radio access network 405 may send keys individually to different user terminals via unicast. For example, different Diffie-Hellmann public keys may be sent rather than using a single shared DH value.

Figure 11:
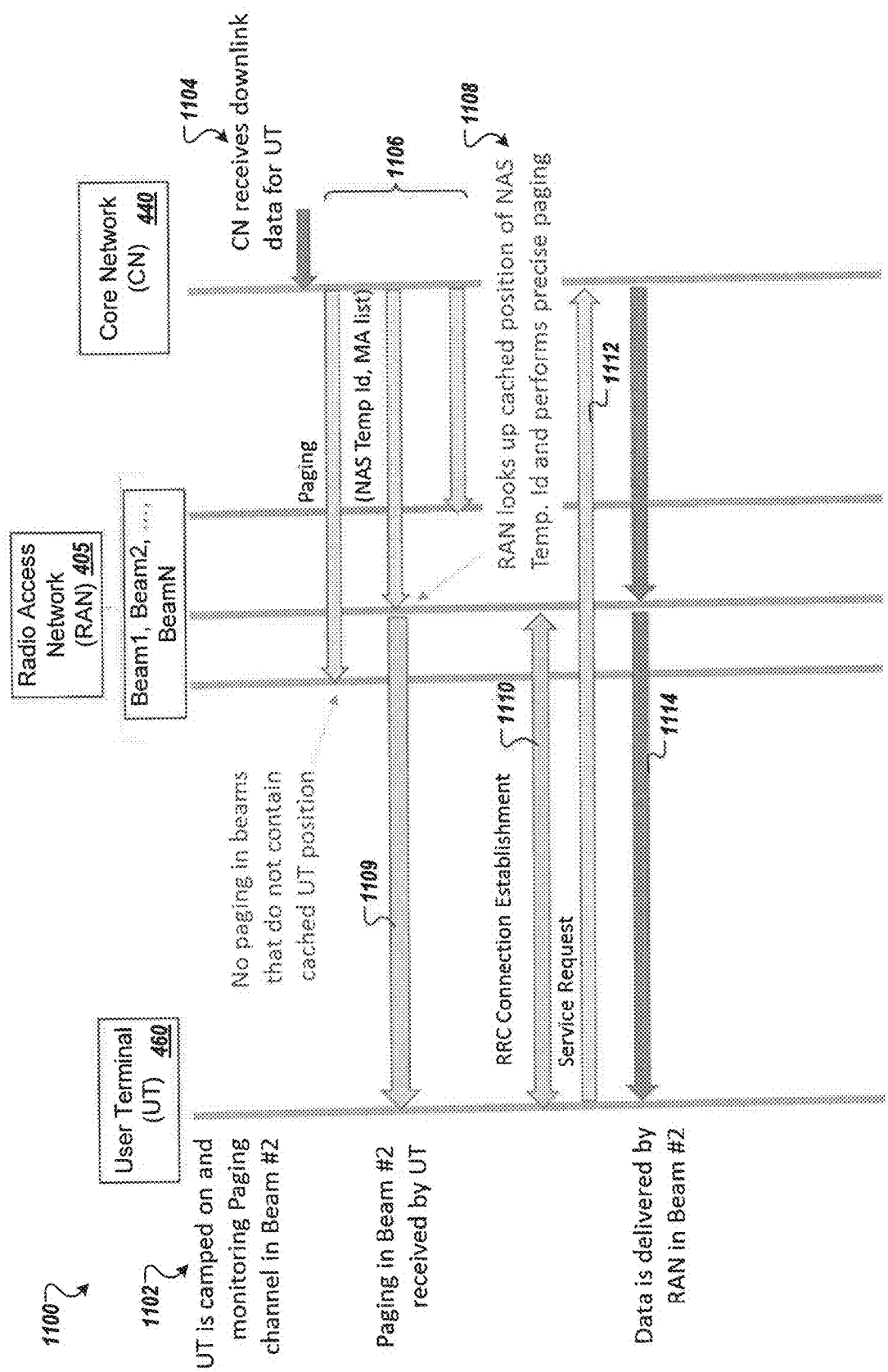
FIG. 11 is a flow diagram showing an example of precise paging in a mobile satellite system.

FIG. 11 is a flow diagram showing an example process 1100 for precise paging in the mobile satellite system 400. Precise paging is supported by the caching of user terminal NAS temporary identifier and position as described in the previous sections (e.g., as part of user terminal position reporting).

Initially, in step 1102 the user terminal 460 is camped on and is monitoring paging channel of a particular satellite beam, e.g., Beam #2 in the example. The radio access network 405 caches the user terminal's NAS temporary identifier and last reported position and retains the information during the RRC idle state.

In step 1104, the core network 440 receives downlink data to be delivered to a user terminal 460 in RRC idle state. In step 1106, the core network 440 sends a paging message (containing the NAS Temporary Identifier and mobility area list of the user terminal 460) to each entity in the radio access network (e.g., a "logical base station") that is responsible for any of the mobility areas in the mobility area list. These logical entities can be, e.g., satellites 410 and/or satellite beams 420 or other subdivisions or elements of the radio access network 405.

In step 1108, the controller of the radio access network 405 then searches its idle user terminal information cache (e.g., a cache of information that the controller of the radio access network 405 maintains about currently or recently connected user terminals) to find the last information cached for the target NAS temporary identifier and retrieves the last reported position. The radio access network 405 determines which radio cell(s), e.g., satellite spot beams 420, that currently cover that target location. To allow for position uncertainty, the set of target radio cells, e.g., satellite spot beams, may be expanded to include those which cover a small region around the target location. The radio access network 405 broadcasts paging messages for the user terminal 460 in only those radio cells or spot beams 420. This is the core function of the precise paging process.

If there is no response to the paging, the radio access network 405 may expand the target set of cells, e.g., spot beams 420, to include additional neighboring cells and repeat the paging. This expansion may be repeated several times as necessary. If no information for the user terminal 460 could be found in the cache, then the radio access network 405 falls back to the non-optimized paging procedure and broadcasts the paging messages in all radio cells currently associated with the target mobility areas.

In the example of FIG. 11, the location information for the user terminal 460 is found in the cache, and the controller of the radio access network 405 determines that the user terminal is located in the coverage area of Beam #2. As a result, as shown in step 1109, the radio access network 405 pages the user terminal 460 using Beam #2 and does not attempt to page the user terminal 460 in the other beams 420.

In step 1110, the user terminal 460 and the radio access network 405 establish an RRC connection. In step 1112, the user terminal 460 sends a service request to the core network 440 as a result of being paged. In step 1114, the core network 440 provides the downlink data to the user terminal 460.

Various techniques can be used to manage idle contexts. The position reporting procedures make it possible for the radio access network 405 to receive and store updated information about each user terminal's unique identifier and position to be used to optimize paging. The radio access network 405 can store these contexts in non-volatile storage.

In a system with multiple base stations, a user terminal 460 may move between base station areas and use the above procedures to update the new base station with its NAS Temporary Identifier and position. However, the old base station still retains an idle mode context for the user terminal 460. In order to avoid accumulating obsolete information, the radio access network 405 can age out cached idle mode contexts after a preconfigured timeout period of T_aging seconds. The T_aging parameter can be set in coordination with the NAS Periodic Registration (Periodic TAU in 4G, Periodic RAU in 3G) timer, for example, slightly larger than the NAS timer.

When a user terminal 460 remains stationary for a long period of time, the radio access network 405 will age out the idle mode context as described above. To avoid this, the user terminal 460 should perform the position reporting/update procedures if it moves more than D_reporting km from the previously reported position OR the previous position report was made more than T_reporting seconds ago, where T_reporting<T_aging.

Implementations of the concepts disclosed herein and all of the functional operations described in this specification may be implemented in digital electronic circuitry, or in computer software, firmware, or hardware, including the structures disclosed in this specification and their structural equivalents, or in combinations of one or more of them. Implementations of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, Implementations of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular Implementations of the invention. Certain features that are described in this specification in the context of separate Implementations may also be implemented in combination in a single implementation. Conversely, various features that are described in the context of a single implementation may also be implemented in multiple Implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the Implementations described above should not be understood as requiring such separation in all Implementations, and it should be understood that the described program components and systems may generally be integrated together in a single software product or packaged into multiple software products.

Moreover, where a table or hash table is mentioned, other data structures (such as spreadsheets, relational databases, or structured files) may be used.

Thus, particular Implementations of the invention have been described. Other Implementations are within the scope of the following claims. For example, the actions recited in the claims may be performed in a different order and still achieve desirable results.

The invention claimed is:

1. A method performed by one or more computers of a satellite network system, the method comprising:
   receiving, from a user terminal configured to communicate using the satellite network system, location data indicating a location of the user terminal;
   based on the location data, identifying a mobility area of the user terminal from among multiple mobility areas representing fixed geographical regions, each of the mobility areas including the areas covered by multiple terrestrial cells;
   providing, to the user terminal, a time or distance threshold specifying a time or distance to trigger additional reporting of data from the user terminal to the satellite network system;
   registering the user terminal in the identified mobility area with a core network;
   accessing a mapping between satellite beams of the satellite network system and the mobility areas;
   updating the mapping between the satellite beams of the satellite network system and the mobility areas to change a correspondence between the satellite beams and the mobility areas due to movement of the satellite beams along the ground with respect to the mobility areas;
   after updating the mapping, identifying a satellite beam currently corresponding to the location of the terminal by using the identified mobility area for the terminal to select a satellite beam specified for the identified mobility area in the updated mapping between the satellite beams and the mobility areas;
   communicating with the user terminal using the identified satellite beam;
   storing a cache of location data for multiple user terminals, wherein the one or more computers are configured to identify specific satellite beams for providing paging messages to user terminals based on the cache of location data for the user terminals;
   receiving, from the core network, one or more paging messages for at least one user terminal provided in response to receipt of downlink data for the user terminal by the core network;
   determining that position data for the at least one user terminal is not found in the cache; and
   in response to determining that position data for the at least one user terminal is not found in the cache, broadcasting paging messages in each spot beam currently associated with a set of target mobility areas for the at least one user terminal.

2. The method of claim 1, comprising, after registering the user terminal in the identified mobility area, receiving, from the core network, a request corresponding to the user terminal; and
   wherein identifying the satellite beam and communicating with the user terminal are performed in response to receiving the request corresponding to the user terminal.

3. The method of claim 2, wherein the request corresponding to the user terminal is a paging request from the core network; and
   wherein communicating with the user terminal using the identified satellite beam comprises paging the user terminal using the identified satellite beam according to the paging request.

4. The method of claim 1, comprising:
   after receiving the location data, storing data indicating the location of the user terminal; and
   retrieving the stored data indicating the location of the user terminal;
   wherein the retrieved data indicating the location of the user terminal is used to identify the satellite beam.

5. The method of claim 4, comprising:
periodically receiving, from the user terminal, updated location data;
updating the stored data indicating the location of the user terminal;
determining, based on the updated location data, that the user terminal has left the identified mobility area and entered a second mobility area; and
in response to determining that the user terminal has entered the second mobility area, designating the second mobility area as a current mobility area for the user terminal.

6. The method of claim 1, wherein registering the user terminal comprises registering the user terminal using a first satellite beam with the user terminal in a first mobility area;
wherein identifying the satellite beam comprises identifying, while the user terminal is located in the first mobility area, a second satellite beam as corresponding to the location of the user terminal, the second satellite beam being different from the first satellite beam.

7. The method of claim 1, wherein the core network is a 3G, 4G, or 5G core network; and
wherein the satellite system acts as a radio access network providing connectivity for a plurality of user terminals to communicate with the core network, the satellite system using communication protocols for terrestrial cellular systems in a manner that is transparent to the core network.

8. The method of claim 1, wherein, for at least a portion of a time period that the user terminal is registered in the identified mobility area, a single mobility area of the mobility areas is covered by portions of multiple satellite beams; and
wherein updating the mapping between satellite beams of the satellite network system and the mobility areas comprises updating the mapping to indicate multiple satellite beams corresponding to a single mobility area.

9. The method of claim 1, wherein receiving the location data comprises receiving global positioning system (GPS) coordinates determined using a GPS receiver of the user terminal.

10. The method of claim 1, wherein receiving the location data comprises receiving data indicating receipt of a signal from the user terminal by multiple different satellites in the satellite network system;
wherein the method comprises estimating a location of the user terminal using triangulation and/or trilateration based on the data indicating receipt of signal from the user terminal by the multiple different satellites in the satellite network system.

11. The method of claim 1, comprising communicating using asymmetric key encryption comprising:
broadcasting a public key to each of multiple user terminals;
receiving location data from each of the multiple user terminals encrypted using the public key; and
decrypting the received location data using a private key.

12. The method of claim 1, comprising communicating using symmetric key encryption comprising:
communicating with the multiple user terminals via unicast to generate a shared session key for each user terminal;
receiving location data from the multiple user terminals, the location data for each of the user terminals being encrypted using a corresponding session key agreed upon with the user terminal; and
decrypting the received location data using the different session keys agreed upon with the user terminals.

13. The method of claim 1, wherein providing the time or distance threshold to the user terminal comprises providing the time or distance threshold in a response to a position report message from the user terminal providing the location data.

14. The method of claim 13, wherein the time or distance threshold comprises a position reporting distance threshold indicating a distance beyond which the user terminal is instructed to send a new position report.

15. The method of claim 13, wherein the time or distance threshold comprises a position reporting time threshold indicating an amount of time after which the user terminal is instructed to send a new position report.

16. The method of claim 1, further comprising:
receiving, from the core network, paging messages for the user terminal provided in response to receipt of downlink data for the user terminal by the core network, wherein the paging messages include a paging message for the user terminal corresponding to each of multiple satellites or satellite beams responsible for at least one of a set of multiple mobility areas in a mobility area list for the user terminal;
searching a user terminal information cache storing information maintained about currently or recently connected user terminals to identify a last-reported position of the user terminal;
identifying a particular satellite spot beam that currently covers the last-reported position of the user terminal; and
sending a paging message to the user terminal using the identified particular spot beam and omitting paging messages for the other multiple satellites or satellite beams.

17. The method of claim 16, further comprising:
determining that the user terminal did not respond to the paging message sent to the user terminal; and
in response to determining that the user terminal did not respond to the paging message sent to the user terminal, repeating transmission of the paging message for the user terminal using the particular spot beam and one or more spot beams neighboring the particular spot beam.

18. A system comprising:
one or more computers; and
one or more computer-readable media storing instructions that, when executed by the one or more computers, cause the one or more computers to perform operations comprising:
receiving, from a user terminal configured to communicate using a satellite network system, location data indicating a location of the user terminal;
based on the location data, identifying a mobility area of the user terminal from among multiple mobility areas representing fixed geographical regions, each of the mobility areas including the areas covered by multiple terrestrial cells;
providing, to the user terminal, a time or distance threshold specifying a time or distance to trigger additional reporting of data from the user terminal to the satellite network system;
registering the user terminal in the identified mobility area with a core network;
accessing a mapping between satellite beams of the satellite network system and the mobility areas;
updating the mapping between the satellite beams of the satellite network system and the mobility areas to change a correspondence between the satellite beams and the mobility areas due to movement of the satellite beams along the ground with respect to the mobility areas;

after updating the mapping, identifying a satellite beam currently corresponding to the location of the terminal by using the identified mobility area for the terminal to select a satellite beam specified for the identified mobility area in the updated mapping between the satellite beams and the mobility areas;

communicating with the user terminal using the identified satellite beam;

storing a cache of location data for multiple user terminals, wherein the one or more computers are configured to identify specific satellite beams for providing paging messages to user terminals based on the cache of location data for the user terminals;

receiving, from the core network, one or more paging messages for at least one user terminal provided in response to receipt of downlink data for the user terminal by the core network;

determining that position data for the at least one user terminal is not found in the cache; and in response to determining that position data for the at least one user terminal is not found in the cache, broadcasting paging messages in each spot beam currently associated with a set of target mobility areas for the at least one user terminal.

19. One or more computer-readable media storing instructions that, when executed by the one or more computers, cause the one or more computers to perform operations comprising:

receiving, from a user terminal configured to communicate using a satellite network system, location data indicating a location of the user terminal;

based on the location data, identifying a mobility area of the user terminal from among multiple mobility areas representing fixed geographical regions, each of the mobility areas including the areas covered by multiple terrestrial cells;

providing, to the user terminal, a time or distance threshold specifying a time or distance to trigger additional reporting of data from the user terminal to the satellite network system;

registering the user terminal in the identified mobility area with a core network;

accessing a mapping between satellite beams of the satellite network system and the mobility areas;

updating the mapping between the satellite beams of the satellite network system and the mobility areas to change a correspondence between the satellite beams and the mobility areas due to movement of the satellite beams along the ground with respect to the mobility areas;

after updating the mapping, identifying a satellite beam currently corresponding to the location of the terminal by using the identified mobility area for the terminal to select a satellite beam specified for the identified mobility area in the updated mapping between the satellite beams and the mobility areas;

communicating with the user terminal using the identified satellite beam;

storing a cache of location data for multiple user terminals, wherein the one or more computers are configured to identify specific satellite beams for providing paging messages to user terminals based on the cache of location data for the user terminals;

receiving, from the core network, one or more paging messages for at least one user terminal provided in response to receipt of downlink data for the user terminal by the core network;

determining that position data for the at least one user terminal is not found in the cache; and in response to determining that position data for the at least one user terminal is not found in the cache, broadcasting paging messages in each spot beam currently associated with a set of target mobility areas for the at least one user terminal.

* * * * *